(12) United States Patent
Burnley et al.

(10) Patent No.: US 12,326,729 B2
(45) Date of Patent: Jun. 10, 2025

(54) METHODS, APPARATUS, AND ARTICLES OF MANUFACTURE TO DISPLAY ACQUISITION PATHS

(71) Applicant: Deere & Company, Moline, IL (US)

(72) Inventors: Ryan C. Burnley, Ankeny, IA (US); Claudia R. Athens, Johnston, IA (US); Ajit K. Thankappan Pillai, West Des Moines, IA (US)

(73) Assignee: Deere &Company, Moline, IL (US)

( * ) Notice: Subject to any disclaimer, the term of this patent is extended or adjusted under 35 U.S.C. 154(b) by 195 days.

(21) Appl. No.: 17/078,866

(22) Filed: Oct. 23, 2020

(65) Prior Publication Data

US 2022/0128993 A1 Apr. 28, 2022

(51) Int. Cl.
*G05D 1/00* (2024.01)
*G01C 21/20* (2006.01)
*A01B 69/04* (2006.01)
*A01D 41/127* (2006.01)

(52) U.S. Cl.
CPC ........... *G05D 1/0088* (2013.01); *G01C 21/20* (2013.01); *A01B 69/008* (2013.01); *A01D 41/1278* (2013.01)

(58) Field of Classification Search
CPC .. A01B 69/008; A01D 41/1278; G01C 21/20; G05D 1/0088; G05D 2201/0201
See application file for complete search history.

(56) References Cited

U.S. PATENT DOCUMENTS

| 7,127,340 | B2 | 10/2006 | Schick et al. | |
|---|---|---|---|---|
| 8,190,364 | B2 | 5/2012 | Rekow | |
| 10,349,573 | B2 | 7/2019 | Peake et al. | |
| 10,645,858 | B2 | 5/2020 | Lawson | |
| 2010/0018726 | A1* | 1/2010 | Chiocco | E02F 9/205 172/1 |
| 2014/0058671 | A1* | 2/2014 | Ichikawa | G01C 21/3694 701/533 |

(Continued)

FOREIGN PATENT DOCUMENTS

WO WO2020111102 A1 6/2020

OTHER PUBLICATIONS

John Deere US, "AutoTrac," Oct. 7, 2020, 7 pages. Retrieved from: https://www.deere.com/en/technology-products/precision-ag-technology/guidance/auto-trac-turn-automation/#.

(Continued)

*Primary Examiner* — Matthew J. Reda
(74) *Attorney, Agent, or Firm* — HANLEY, FLIGHT & ZIMMERMAN, LLC

(57) ABSTRACT

Methods, apparatus, systems, and articles of manufacture are disclosed to display acquisition paths. An example apparatus includes a display handler to, in response to a directional condition of an autonomous vehicle satisfying a threshold, render an acquisition path for the autonomous vehicle, the acquisition path specifying a route along which the autonomous vehicle is to travel to acquire a guidance path; and a vehicle condition controller to, in response to determining that a real time display criterion is satisfied, redetermine whether the directional condition of the autonomous vehicle satisfies the threshold to cause the display handler to re-render the acquisition path.

22 Claims, 11 Drawing Sheets

(56) References Cited

U.S. PATENT DOCUMENTS

| | | | | |
|---|---|---|---|---|
| 2014/0244125 | A1* | 8/2014 | Dorum | B60W 40/109 |
| | | | | 701/1 |
| 2015/0019081 | A1* | 1/2015 | Katupitiya | A01B 69/006 |
| | | | | 701/41 |
| 2016/0171012 | A1* | 6/2016 | Davidson | G06F 16/29 |
| | | | | 701/532 |
| 2016/0334219 | A1* | 11/2016 | Askarpour | G01C 23/00 |
| 2017/0269593 | A1* | 9/2017 | Letwin | B60W 50/082 |
| 2017/0293303 | A1* | 10/2017 | Medagoda | B62D 15/029 |
| 2017/0357262 | A1 | 12/2017 | Dix et al. | |
| 2018/0321682 | A1 | 11/2018 | Matsumoto et al. | |
| 2019/0120644 | A1* | 4/2019 | Alcazar | G01C 21/3492 |
| 2020/0004332 | A1* | 1/2020 | Jeon | G06F 3/0304 |
| 2020/0094984 | A1* | 3/2020 | Cazaux | G06T 11/00 |
| 2020/0116518 | A1* | 4/2020 | Lee | G06F 3/013 |
| 2020/0133262 | A1* | 4/2020 | Suleman | G05D 1/0278 |
| 2021/0026362 | A1* | 1/2021 | Wilson | B60K 35/22 |
| 2021/0231451 | A1* | 7/2021 | Tümler | G01C 21/20 |
| 2023/0094918 | A1* | 3/2023 | Nakabayashi | G05D 1/12 |
| | | | | 701/3 |

OTHER PUBLICATIONS

Extended European Search Report and Written Opinion issued in European Patent Application No. 21199220.1, dated Apr. 4, 2022, in 08 pages.

* cited by examiner

METHODS, APPARATUS, AND ARTICLES OF MANUFACTURE TO DISPLAY ACQUISITION PATHS

FIELD OF THE DISCLOSURE

This disclosure relates generally to vehicle steering, and, more particularly, to methods, apparatus, and articles of manufacture to display acquisition paths.

BACKGROUND

Agricultural vehicles have become increasingly automated. Agricultural vehicles may semi-autonomously or fully-autonomously drive and perform operations on fields using implements for planting, spraying, harvesting, fertilizing, stripping/tilling, etc. These autonomous agricultural vehicles include multiple sensors (e.g., Global Navigation Satellite Systems (GNSS), Global Positioning Systems (GPS), Light Detection and Ranging (LIDAR), Radio Detection and Ranging (RADAR), Sound Navigation and Ranging (SONAR), telematics sensors, etc.) to help navigate without assistance, or with limited assistance, from human users.

Figure 1:
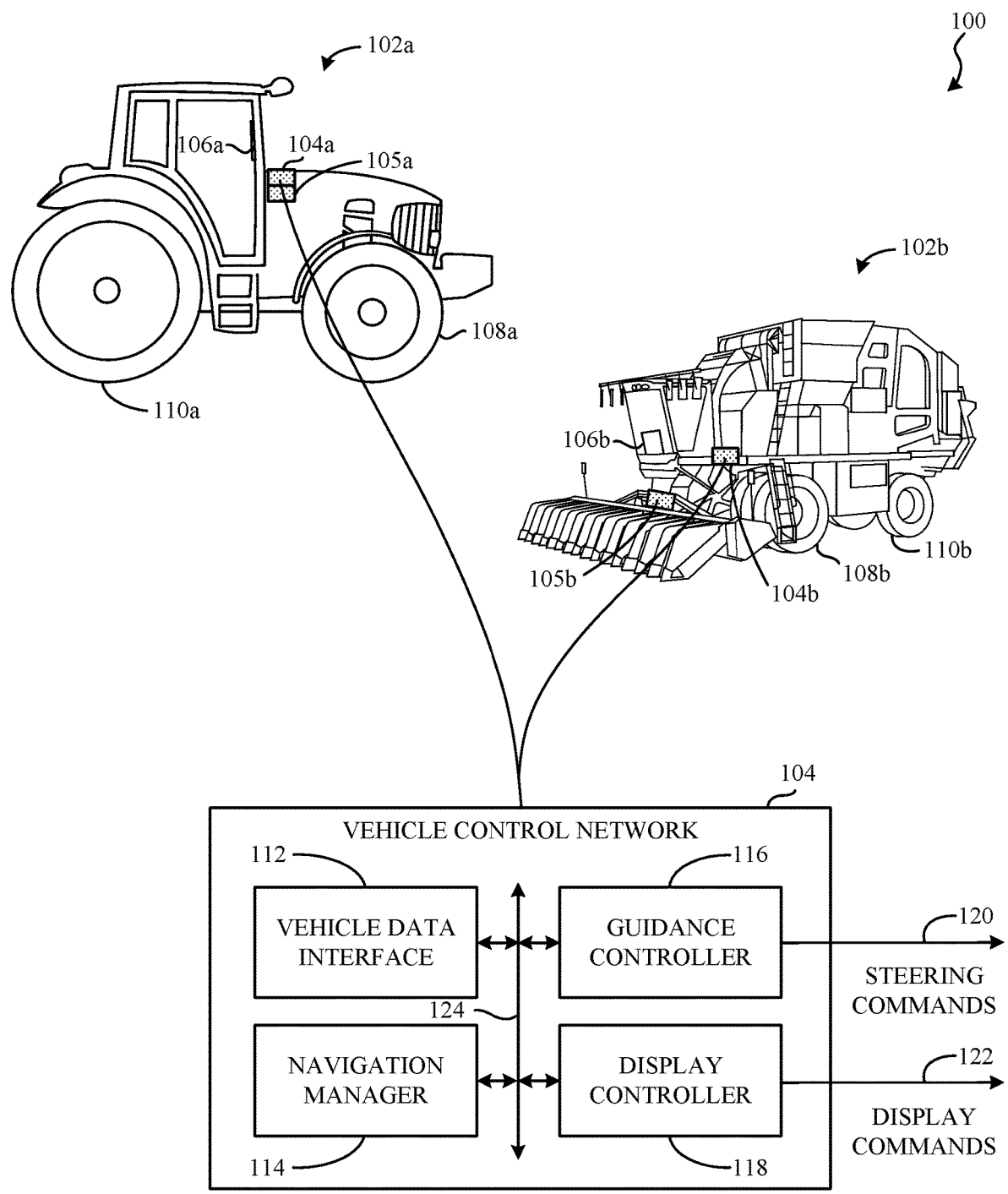
FIG. 1 is a schematic illustration of a first vehicle and a second vehicle, each including an example vehicle control network.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real-world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Automation of agricultural vehicles is highly commercially desirable, as automation can improve the accuracy with which operations are performed, reduce operator fatigue, improve efficiency, and accrue other benefits. Some automated vehicles include and/or are otherwise enabled for automation functionality, but the user may need to engage and/or disengage the automation functionality. For example, a user could switch a vehicle into an autonomous mode of operation, but the vehicle would not autonomously drive until the user presses a button or toggles a switch to "engage" automation. As such, the vehicle can be referred to as being in a "standby" autonomous mode of operation when automation is enabled but not engaged and in a "fully" autonomous mode of operation when automation is enabled and engaged. In either standby autonomous mode or fully autonomous mode, a user may be present within the vehicle.

Whether in standby autonomous mode or fully autonomous mode, autonomous vehicles include one or more controllers to ensure that the autonomous vehicles traverse terrain properly. In examples disclosed herein, automated vehicles follow guidance paths when in fully autonomous mode. A controller may have many different modes of operation including an acquisition mode of operation and a tracking mode of operation. As used herein, "tracking,"

"tracking mode," "tracking mode of operation," and/or their derivatives refer to following and/or tracking a guidance path (e.g., fully autonomous mode). As used herein, "acquisition," "acquisition mode," "acquisition mode of operation," and/or their derivatives refer to operation when the vehicle is travelling to a guidance path, a path, and/or acquiring a position that is substantially similar to (e.g., within one meter of, within a half meter of, within two meters of, etc.) a guidance path. The path a vehicle takes or may take during acquisition mode is referred to herein as "an acquisition path," and "an acquisition line," among others.

Guidance paths are used by a navigation and/or location apparatus (e.g., a GNSS receiver) and a controller in tracking mode for a vehicle to follow a prescribed path. In some examples, the prescribed path includes turns, curves, etc., for the vehicle to follow when operating in a field. Conventional controllers, sometimes referred to as guidance systems, allow users of a vehicle to specify a guidance path for the vehicle in the cab. During operation of the controllers (e.g., guidance systems), guidance paths are displayed on a user interface, typically along with the current position of the vehicle relative to the defined paths.

When conventional controllers (e.g., guidance systems) control a vehicle to acquire one of these paths, the user (e.g., vehicle operator) has no knowledge of what trajectory the vehicle will take to approach and line up with (e.g., acquire) the desired path. If the vehicle turns more aggressively than anticipated toward the path, the user can experience discomfort and dissatisfaction. If the vehicle takes longer than the user anticipated to acquire the path, the user may be dissatisfied. In some examples, if a vehicle is located between multiple possible paths, conventional controllers control the vehicle to the incorrect path.

In some examples, a person may perform a qualitative analysis on how well the vehicle acquired the path. For example, the user may give feedback to a vehicle tuning operation (e.g., a mechanic) who then tunes the vehicle to better acquire the path. Additionally or alternatively, the user may manually tune the vehicle to better acquire the path. Example qualitative analysis includes asking questions such as "Did that feel about right?" "Was that too slow?" or "Was that too fast?" However, such "tunable" controllers (e.g., guidance systems) primarily rely on qualitative, subjective, manually collected, metrics to gauge acquisition performance.

Some systems (e.g., AutoTrac™ Turn Automation) display a temporary path when a vehicle transitions from one guidance path to another (e.g., an end-of-pass turn). Such systems update the temporary path in real time (e.g., dynamically) based on changing user settings. For example, the user settings may include the minimum turn radius of the vehicle, aggressiveness settings of the vehicle, skipping paths, etc. For example, a default operation of some turn automation systems is to turn (e.g., right or left) to the immediately adjacent path. Skipping allows a user to select another path (e.g., two paths away from the current path) to which the vehicle will travel. However, existing and conventional guidance systems do not display (e.g., visualize) the transition from the current location (e.g., any location, not on a guidance path, etc.) of a vehicle to a desired guidance path. Additionally, existing and conventional guidance systems do not re-render and/or otherwise update acquisition paths in real time without the interaction of a user. Instead, in such existing and conventional guidance systems, a user must manually press a button or toggle a switch to enable updating paths.

Unlike conventional techniques, examples disclosed herein display one or more temporary paths that update in real time (e.g., dynamically) based on the position of a vehicle relative to a guidance path (e.g., a desired path). Examples disclosed herein include a system and method for visualizing to a user a generated path (e.g., an acquisition path) from the current location of a vehicle to a selected (e.g., desired) guidance path. Examples disclosed herein describe how acquisition paths are presented to the vehicle user (e.g., operator) as well as how acquisition paths are updated in real time. Examples disclosed herein include a system and method to update acquisition paths in real time to show the user how the trajectory of the vehicle changes based on conditions of the vehicle including heading error, vehicle speed, and direction of travel of the vehicle. Examples disclosed herein allow vehicle users to see where the vehicle will travel when steering automation is engaged. Examples disclosed herein, update (e.g., regenerate) the acquisition path (e.g., planned trajectory) in real time to continually reflect the current position of the vehicle relative to the guidance path (e.g., desired path) before the user engages automation. Examples disclosed herein allow vehicle users (e.g., operators) to easily discern the acquisition path (e.g., planned acquisition trajectory) to the guidance path (e.g., desired path).

FIG. 1 is a schematic illustration of an example first vehicle 102a including an example vehicle control network 104a and an example second vehicle 102b including an example vehicle control network 104b. Each of the vehicle control network 104a, 104b guide the first vehicle 102a and the second vehicle 102b, respectively. The first vehicle 102a includes the vehicle control network 104a, an example location sensor 105a, an example user display 106a, an example front wheel 108a, and an example rear wheel 110a. The second vehicle 102b includes the vehicle control network 104b, an example location sensor 105b, an example user display 106b, an example front wheel 108b, and an example rear wheel 110b.

As illustrated and described herein, the structure and/or function of any one of the vehicle control network 104b, the location sensor 105b, the user display 106b, the front wheel 108b, and/or the rear wheel 110b, may be the same as the corresponding component on the first vehicle 102a. Therefore, for example, description and/or illustration associated with the user display 106a of the first vehicle 102a can be considered to apply equally to the user display 106b of the second vehicle 102b. As used herein, when referring to "the vehicle 102," it is to be understood that the description and/or illustration applies to both the first vehicle 102a and the second vehicle 102b. Similarly, when referring to any one or more of the components of the first vehicle 102a or the second vehicle 102b, if a component is discussed (e.g., the vehicle control network 104, the location sensor 105, the user display 106, the front wheel 108, the rear wheel 110, etc.), it is to be understood that the illustration and/or description applies to these respective parts on both of the first vehicle 102a and the second vehicle 102b.

In the example illustrated in FIG. 1, the first vehicle 102a is a tractor and the second vehicle 102b is a cotton stripper. The first vehicle 102a and the second vehicle 102b may be any type of vehicle (e.g., a tractor, front loader, harvester, cultivator, or any other suitable vehicle) configured to track a projected path and/or curved path. For example, the first vehicle 102a may be a tractor capable of automatically tracking a row of crops to harvest the row of crops. The first vehicle 102a and/or the second vehicle 102b may be a front wheel steer vehicle or a rear wheel steer vehicle. As used herein, a front wheel steer vehicle steers by rotating its front wheels, (such as the front wheel 108*a*), while a rear wheel steer vehicle steers by rotating its rear wheels (such as the rear wheel 110*b*). In some examples, the vehicle 102 may be implemented as an articulated vehicle which includes a different steering system as compared to front wheel and/or rear wheel steer vehicles. In examples disclosed herein, the vehicle 102 is equipped with the vehicle control network 104 to control and/or otherwise command the vehicle 102 to acquire and/or track a predetermined path. The vehicle control network 104 is explained in further detail below.

In the illustrated example of FIG. 1, the example user display 106 is implemented by a Generation 4 Command-Center™ Display. In additional or alternative examples, the user display 106 may be implemented by a liquid crystal display (LCD) touch screen such as a tablet, a computer monitor, etc. In the example of FIG. 1, the user display 106 is an interactive display on which a user may select and/or enter desired inputs (e.g., select a screen display, enter desired vehicle speed, enter aggressiveness variables, select the sampling interval, power on and/or off the vehicle, etc.) before, during, and/or after operation of the vehicle 102. Additionally, the example user display 106 is utilized to display the prescribed path to a user operating the vehicle 102. The user display 106 can also display navigation path data and/or vehicle location data.

For example, the user display 106 displays various guidance paths (e.g., prescribed paths) that the vehicle 102 can acquire. The user display 106 also displays the acquisition path by which the vehicle 102 may acquire the guidance path. Various examples of user interfaces displayed on the user display 106 are illustrated and described in connection with FIGS. 3-12.

In the illustrated example of FIG. 1, the first vehicle 102*a* is implemented as a front wheel steer vehicle. As such, the first vehicle 102*a* turns in response to a rotation of the front wheel 108*a*. For example, if the user or an autonomous driving system decides to turn left, the front wheel 108*a* is rotated to the left. The second vehicle 102*b* is implemented as a rear wheel steer vehicle. As such, the second vehicle 102*b* turns in response to a rotation of the rear wheel 110*b*. In examples disclosed herein, the front wheels 108*a, b* are located on a front wheel axle with one or more additional corresponding front wheels. Likewise, in examples disclosed herein, the rear wheels 110*a, b* are located on a rear wheel axle with one or more additional corresponding rear wheels.

In the illustrated example of FIG. 1, the vehicle control network 104 includes an example vehicle data interface 112, an example navigation manager 114, an example guidance controller 116, an example display controller 118. In the example of FIG. 1, the guidance controller 116 generates example steering commands 120. In the example of FIG. 1, the display controller 118 generates example display commands 122. In the example of FIG. 1, any of the vehicle data interface 112, the navigation manager 114, the guidance controller 116, and/or the display controller 118 can communicate via an example communication bus 124.

In examples disclosed herein, the communication bus 124 may be implemented using any suitable wired and/or wireless communication. In additional or alternative examples, the communication bus 124 includes software, machine readable instructions, and/or communication protocols by which information is communicated among the vehicle data interface 112, the navigation manager 114, the guidance controller 116, and/or the display controller 118.

In the illustrated example of FIG. 1, the vehicle data interface 112 is implemented by a processor executing instructions. In additional or alternative examples, the vehicle data interface 112 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). In additional or alternative examples, the vehicle data interface 112 may be implemented by a memory, such as that described in connection with FIG. 14.

In the illustrated example of FIG. 1, the vehicle data interface 112 provides information to the guidance controller 116 and/or the display controller 118 corresponding to vehicle data, such as measurements of vehicle parts, distances between relative areas of vehicle, etc. In some examples, the vehicle data interface 112 may include preset and/or predetermined values, measurements, distances, of the vehicle 102. The example vehicle data interface 112 may accept user input before operation of the vehicle 102 can occur, to correctly operate in tracking mode. In additional or alternative examples, the vehicle data interface 112 receives a notification from the guidance controller 116 and/or the display controller 118 when the guidance controller 116 and/or the display controller 118 requests vehicle data to determine steering commands 120 and/or display commands 122, respectively.

In the illustrated example of FIG. 1, the navigation manager 114 is implemented by a processor executing instructions. In additional or alternative examples, the navigation manager 114 can be implemented by one or more analog or digital circuit(s), logic circuits, programmable processor(s), programmable controller(s), GPU(s), DSP(s), ASIC(s), PLD(s), and/or FPLD(s). In the example of FIG. 1, the navigation manager 114 accesses navigation data from the location sensor 105.

In the illustrated example of FIG. 1, the navigation manager 114 accesses navigation path data indicating one or more paths (e.g., guidance paths) that the vehicle 102 is to follow to perform a field operation. In some examples, the navigation manager 114 accesses current location data corresponding to a location of the location sensor 105. The navigation manager 114 communicates navigation and/or location data to the guidance controller 116 and/or the display controller 118.

In some examples, the location sensor 105 is part of (e.g., integrated with) the vehicle control network 104. In some examples the location sensor 105 is located separate from the vehicle control network 104 on the vehicle 102. However, even when the location sensor 105 is separate from the vehicle control network 104, it is still in communication (e.g., wired or wirelessly) with the vehicle control network 104.

In the illustrated example of FIG. 1, the location sensor 105*a* on the first vehicle 102*a* (e.g., a front wheel steer vehicle) is positioned between the rear wheel 110*a* and the front wheel 108*a* (e.g., between the front axle and the rear axle). In the example of FIG. 1, the location sensor 105*b* on the second vehicle 102*b* (e.g., a rear wheel steer vehicle) is located closer to a front end of the vehicle than the front wheel 108*b* or the front axle. In other examples, the location sensor 105 may be located at any position on the vehicle 102 and/or may be integrated with another component (e.g., the navigation manager 114).

In the illustrated example of FIG. 1, the location sensor 105 is implemented by a GNSS receiver. In additional or alternative examples, the location sensor 105 may be implemented by a GNSS receiver controller, a GPS receiver, a GPS receiver controller, and/or any other component capable of sensing and/or determining location information. In the example of FIG. 1, the location sensor 105 communicates with the navigation manager 114, the guidance controller 116, and/or the display controller 118 to provide and/or otherwise transmit a geographical location of the vehicle 102 and/or navigation path data. In some examples disclosed herein, the location sensor 105 samples the geographical location of the vehicle 102 at a threshold interval. For example, every 0.1 seconds, the location sensor 105 may send the geographical location of the vehicle 102 to the vehicle control network 104. In examples disclosed herein, the location sensor 105 may communicate with the guidance controller 116 and/or the display controller 118 to obtain the guidance path (e.g., the desired path) along which the vehicle 102 is to travel. For example, the location sensor 105 may obtain the guidance path after a user has selected the guidance path via the user display 106.

In some examples, the location sensor 105 determines when the vehicle 102 is approaching a curved path based on navigation path data and provides a signal, notification, etc., to the vehicle control network 104. For example, the location sensor 105 may include a memory which receives and stores data corresponding to predetermined path information (e.g., guidance path data) along which the vehicle 102 is to travel to keep the location sensor 105 on the predetermined path. In some examples, the location sensor 105 is in communication with the guidance controller 116 and/or the display controller 118 to provide location data and/or predetermined path data for the guidance controller 116 and/or the display controller 118 (e.g., via the navigation manager 114).

During tracking mode, the vehicle control network 104 calculates a lateral error of the vehicle 102, a heading error of the vehicle 102, a rate of change of the heading error of the vehicle 102, and a path curvature measurement of the vehicle 102. In the example of FIG. 1, during tracking mode the vehicle 102 may or may not be at the geographical location corresponding to a portion (e.g., a curved portion, a straight portion, and/or a starting position) of a guidance path. As such, the vehicle control network 104 may calculate the lateral error.

In some examples disclosed herein, lateral error refers to the shortest distance between a location sensor and a desired path (e.g., a guidance path). In additional or alternative examples, lateral error may be defined as the distance perpendicular to a desired path from a location sensor. In some examples disclosed herein, the heading of the vehicle 102, also referred to as the yaw of the vehicle 102, is defined as the direction in which the vehicle 102 is pointing. For example, the heading can be drawn by a straight line, starting from the front of the vehicle 102 and extending in the direction the vehicle is traveling. In some examples disclosed herein, heading error refers to a difference between a line tangent to a navigation curve at a current location of a location sensor and a current heading (directional orientation) of a vehicle. For example, heading error can be defined as the distance or angle between a tangent line and a prescribed path, a specific location, and/or the actual heading of the vehicle.

In some examples disclosed herein, path curvature refers to the curvature of a path which a vehicle (e.g., the vehicle 102) is to follow. The path curvature is predetermined, before the vehicle is in motion and performing an operation (e.g., seeding, fertilizing, etc.). The navigation path data includes the path curvature and is stored for use by the example guidance controller 116 when determining the commanded steering angle, the lateral error offset adjustment, and the heading error offset adjustment that causes the vehicle 102 to follow a prescribed curved path. The path curvature may also be accessed by the display controller 118 when generating the display commands 122.

In the illustrated example of FIG. 1, guidance controller 116 is implemented by a processor executing instructions. In additional or alternative examples, the guidance controller 116 can be implemented by one or more analog or digital circuit(s), logic circuits, programmable processor(s), programmable controller(s), GPU(s), DSP(s), ASIC(s), PLD(s), and/or FPLD(s). In the example of FIG. 1, the guidance controller 116 calculates a wheel steering angle (e.g., a front wheel steering angle for the first vehicle 102a and/or a rear wheel steering angle for the second vehicle 102b), the lateral error offset adjustment value, and/or a heading error offset adjustment value to cause the vehicle 102 (more specifically, the location sensor 105 of the vehicle 102) to follow a predetermined path represented in navigation data.

In some examples disclosed herein, the wheel steering angle is a numerical value representative of the angular measurement (e.g., 14 degrees, negative 30 degrees, etc.) to apply the front wheel 108a (e.g., for the first vehicle 102a) or the rear wheel 110b (e.g., for the second vehicle 102b). The guidance controller 116 of the illustrated example outputs one or more example steering commands 120 to cause the steering wheels of the vehicle 102 to move to keep the location sensor 105 on a predetermined path. In some examples disclosed herein, a wheel angle command, steering angle command, feedforward wheel angle command, etc., refers to a control signal that specifies the angle at which the wheels of the vehicle should turn to follow a prescribed path.

In some examples, the guidance controller 116 attempts to drive all errors (e.g., lateral error, heading error, etc.) errors relative to a prescribed path to zero with the use of guidance controller gains to force the location sensor 105 to precisely follow the prescribed path. For example, when the errors are zero (e.g., within a threshold of zero), the location sensor 105 is considered to be accurately following the prescribed path. In some examples, the guidance controller 116 transmits the one or more steering commands 120 to a steering apparatus on the vehicle 102. For example, the guidance controller 116 transmits steering commands to a front wheel steering apparatus of the first vehicle 102a. Similarly, the guidance controller 116 transmits steering commands to a rear wheel steering apparatus of the second vehicle 102b.

In the illustrated example of FIG. 1, the display controller 118 is implemented by a processor executing instructions. In additional or alternative examples, the display controller 118 can be implemented by one or more analog or digital circuit(s), logic circuits, programmable processor(s), programmable controller(s), GPU(s), DSP(s), ASIC(s), PLD(s), and/or FPLD(s). In the example of FIG. 1, manages the display of one or more acquisition paths and/or one or more guidance paths on the user display 106.

In the illustrated example of FIG. 1, based on at least lateral error of the vehicle 102, heading error of the vehicle 102, heading of the vehicle 102, speed of the vehicle 102, and/or whether fully autonomous mode is engaged for the vehicle 102, the display controller 118 generates one or more display commands 122 to display, update, and/or otherwise render one or more acquisition paths. Additionally, the display controller 118 may display one or more guidance paths based on navigation path data and/or guidance path data accessed from the location sensor 105 and/or the navigation manager 114. Additional detail of the display controller 118 is illustrated and discussed in connection with FIG. 2.

Figure 2:
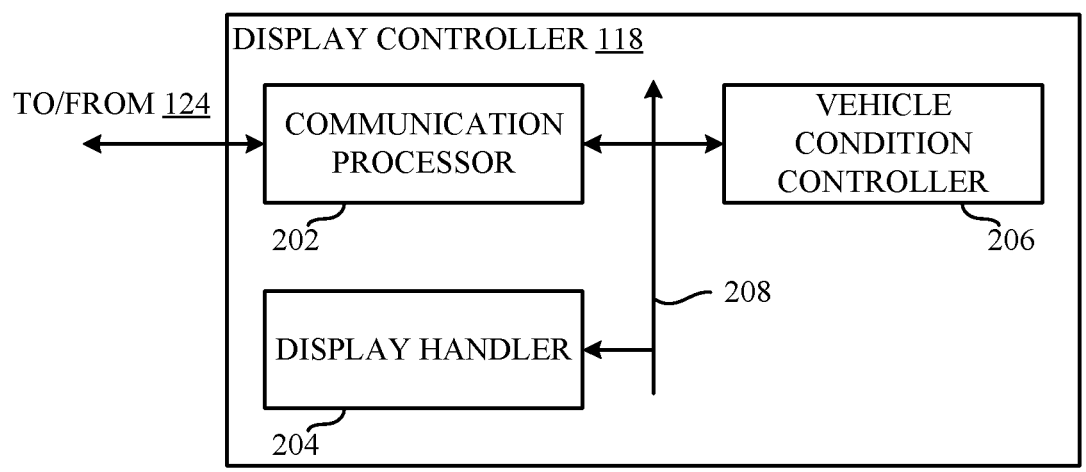
FIG. 2 is a block diagram of an example display controller of the vehicle control network of FIG. 1.

FIG. 2 is a block diagram showing additional detail of the display controller 118 of FIG. 1. The display controller 118 includes an example communication processor 202, an example display handler 204, and an example vehicle condition controller 206. In the example of FIG. 2, one or more of the communication processor 202, the display handler 204, or the vehicle condition controller 206 may be implemented as instructions (e.g., software) executing on a processor, such as the processor 1412 of FIG. 14. In the example of FIG. 2, any of the communication processor 202, the display handler 204, and/or the vehicle condition controller 206 can communicate via an example communication bus 208.

In examples disclosed herein, the communication bus 208 may be implemented using any suitable wired and/or wireless communication. In additional or alternative examples, the communication bus 208 includes software, machine readable instructions, and/or communication protocols by which information is communicated among the communication processor 202, the display handler 204, and/or the vehicle condition controller 206.

In the illustrated example of FIG. 2, the communication processor 202 is implemented by instructions executing on a processor. In additional or alternative examples, the communication processor 202 can be implemented by one or more analog or digital circuit(s), logic circuits, programmable processor(s), programmable controller(s), GPU(s), DSP(s), ASIC(s), PLD(s) and/or FPLD(s). The example communication processor 202 functions as a network interface structured to communicate with other devices (e.g., other components of the vehicle control network 104 and/or the vehicle 102) with a designated physical and data link layer standard.

In the illustrated example of FIG. 2, the communication processor 202 monitors the user display 106 and/or other buttons and/or switches within the cab of the vehicle 102 to determine whether a user has placed the vehicle control network 104 in standby autonomous mode or in fully autonomous mode. Additionally, the communication processor 202 monitors the user display 106 to determine whether a user has selected a guidance path to acquire.

In some examples, the communication processor 202 implements example means for processing communications. The communication processing means is implemented by executable instructions such as that implemented by at least blocks 1310, 1318, 1338, and 1342 of FIG. 13. The executable instructions of blocks 1310, 1318, 1338, and 1342 of FIG. 13 may be executed on at least one processor such as the example processor 1412 of FIG. 14. In other examples, the communication processing means is implemented by hardware logic, hardware implemented state machines, logic circuitry, and/or any other combination of hardware, software, and/or firmware.

In the illustrated example of FIG. 2, the display handler 204 is implemented by instructions executing on a processor. In additional or alternative examples, the display handler 204 can be implemented by one or more analog or digital circuit(s), logic circuits, programmable processor(s), programmable controller(s), GPU(s), DSP(s), ASIC(s), PLD(s) and/or FPLD(s). The display handler 204 is configured to control the display and/or generation of one or more representations of a vehicle, one or more representations of an implements, one or more guidance paths, and/or one or more acquisitions paths. These representations and/or paths are rendered within a user interface displayed on the user display 106. The representations are rendered relative to one or more guidance paths displayed on display handler 204.

In the illustrated example of FIG. 2, the display handler 204 is configured to display and/or otherwise render one or more guidance paths on the user display 106. For example, the display handler 204 accesses guidance paths from the navigation path data via the navigation manager 114. In the example of FIG. 2, the display handler 204 also displays the location of the vehicle 102 and/or any implements that may be attached to the vehicle 102 with respect to the guidance paths. For example, the display handler 204 renders a representation of the vehicle 102 and/or a representation of any implements attached to the vehicle 102. In the example of FIG. 2, the display handler 204 displays, renders, and/or otherwise generates a representation of one or more acquisitions paths based on one or more determinations made by the vehicle condition controller 206.

In the illustrated example of FIG. 2, the display handler 204 renders acquisition paths for vehicles as dashed lines in the same color as the respective guidance paths to be acquired. For example, if a guidance path to be acquired is white, the display handler 204 renders the acquisition path for the vehicle 102 as a dashed white line. In examples disclosed herein, acquisition paths are dashed to indicate to the user of the vehicle 102 that the paths are temporary. As such, examples disclosed herein, allow a user to distinguish between acquisition paths and guidance paths. For acquisition paths for implements, the display handler 204 renders the acquisition paths as dashed lines in the same color as the representation of the implement. In some examples, the display handler 204 renders acquisition paths of implements in the same color as the respective guidance paths for the implements. In additional or alternative examples, the display handler 204 may render the acquisition paths according to another pattern different than dashed lines (e.g., dotted, solid, dashed-dotted, etc.).

In the illustrated example of FIG. 2, the display handler 204 renders acquisition paths differently depending on whether the vehicle control network 104 is in standby autonomous mode or in fully autonomous mode. For example, if the vehicle control network 104 is in standby autonomous mode, the display handler 204 regenerates and/or otherwise updates acquisition paths in real time and/or based on one or more triggers (e.g., real time display criteria). In some examples, the display handler 204 updates acquisition paths based on real time display criteria such as after a timer expires. For example, the display handler 204 can update acquisition paths every 200 milliseconds (ms).

Additionally or alternatively, the display handler 204 updates acquisition paths based on real time display criteria such as a relative change in the position of the vehicle 102. For example, the display handler 204 updates acquisition paths based on a distance traveled by the vehicle 102 (as compared to a threshold) and a change in the heading of the vehicle 102 (as compared to a threshold), among others. Other triggers are possible. In some examples, the display handler 204 does not render acquisition paths until the vehicle 102 is placed in a fully autonomous mode of operation.

Alternatively, in the illustrated example of FIG. 2, if the vehicle control network 104 is in fully autonomous mode, the display handler 204 generates an acquisition path for the vehicle 102 and/or any attached implements and generally does not update the acquisition path(s) as the vehicle 102 acquires the selected guidance path. In such examples, after the vehicle 102 acquires the selected guidance path, the display handler 204 updates the rendering of the acquisition path(s) (e.g., no longer displays the acquisition path(s)). In some examples, the display handler 204 does not render acquisition paths at all, but the guidance controller 116 continues to determine real time updates to the acquisition path that are used to steer the vehicle 102.

In some examples, when the vehicle control network 104 is in fully autonomous mode, the display handler 204 will update the rendering of acquisition paths. For example, if the lateral error of the vehicle 102 exceeds (e.g., satisfies) a lateral error threshold, the display handler 204 updates the rendering of acquisition paths. As such, if the guidance controller 116 recomputes the acquisition path due to poor acquisition performance (e.g., due to vehicle slippage), the display handler 204 communicates the updated acquisition path to the user in real time.

Additionally or alternatively, if the speed of the vehicle 102 changes by a threshold amount (e.g., a speed change of the vehicle 102 exceeds (e.g., satisfies) a speed change threshold), the display handler 204 updates the rendering of acquisition paths. As such, if the original acquisition path calculated by the guidance controller 116 is recalculated due to steering limitations of the vehicle 102, the display handler 204 communicates the recalculated acquisition path to the user in real time. Additionally or alternatively, if the direction of travel of the vehicle 102 changes (e.g., from forward to reverse, reverse to forward, left to right, right to left, etc.), the display handler 204 updates the rendering of acquisition paths. Other criteria are possible for updating the rendering of the acquisition paths when in a fully autonomous mode of operation.

In some examples, the display handler 204 determines that one or more acquisition paths are not to be displayed. For example, if the vehicle control network 104 is in standby autonomous mode and the vehicle 102 is in a position from which a feasible acquisition path cannot be calculated (e.g., by the guidance controller 116), the display handler 204 will not render an acquisition path. For example, the guidance controller 116 determines an acquisition path when the vehicle 102 is within a threshold distance of a guidance path. However, in examples disclosed herein, there is a section between guidance paths that is outside of the threshold distance for either guidance path. As such, this section can be referred to as a "no man's land" between guidance paths. Conditions that can cause the display handler 204 to determine not to render an acquisition path (sometimes referred to as error conditions) include the vehicle 102 having a lateral error that is greater than (e.g., satisfies) a first lateral error threshold (e.g., within the no man's land) and the vehicle 102 having a heading error greater than (e.g., satisfies) a heading error threshold, among others. Other criteria for not displaying acquisition paths are possible.

In the illustrated example of FIG. 2, the display handler 204 generates acquisitions for implements when guidance information is available for the implement. For example, in the case of implements, guidance information includes implement dimensions (e.g., working width, tongue length, etc.), lateral error, heading error, speed (e.g., of the vehicle and/or implement), heading (e.g., of the vehicle and/or implement), among others. Examples disclosed herein determine a minimum turn radius of the implement based on the implement dimensions. In some examples, the display handler 204 renders acquisitions paths for implements based on guidance information for the implement that is imputed based on guidance information for the vehicle 102. For example, in the case of vehicles, guidance information includes minimum turn radius, lateral error, heading error, speed (e.g., of the vehicle and/or implement), heading (e.g., of the vehicle and/or implement), among others.

In some examples, the display handler 204 implements example means for displaying paths. The path displaying means is implemented by executable instructions such as that implemented by at least blocks 1302, 1306, 1308, 1316, 1320, 1324, 1326, 1334, and 1340 of FIG. 13. The executable instructions of blocks 1302, 1306, 1308, 1316, 1320, 1324, 1326, 1334, and 1340 of FIG. 13 may be executed on at least one processor such as the example processor 1412 of FIG. 14. In other examples, the path displaying means is implemented by hardware logic, hardware implemented state machines, logic circuitry, and/or any other combination of hardware, software, and/or firmware.

In the illustrated example of FIG. 2, the vehicle condition controller 206 is implemented by instructions executing on a processor. In additional or alternative examples, the vehicle condition controller 206 can be implemented by one or more analog or digital circuit(s), logic circuits, programmable processor(s), programmable controller(s), GPU(s), DSP(s), ASIC(s), PLD(s) and/or FPLD(s). The vehicle condition controller 206 is configured to determine the conditions of the vehicle 102. Additionally, the vehicle condition controller 206 is configured to determine the position and/or heading of the vehicle 102 relative to one or more guidance paths. For example, the vehicle condition controller 206 determines whether a condition of the vehicle 102 satisfies a threshold. For example, conditions of the vehicle 102 include at least one of lateral error of the vehicle 102, heading error of the vehicle 102, and/or speed change of the vehicle 102.

In the illustrated example of FIG. 2, the vehicle condition controller 206 is configured to determine whether one or more implements are attached to the vehicle 102 and whether guidance information for such implements is available. Based on such a determination, the display handler 204 displays one or more representations of the vehicle 102 and/or one or more representations of implements attached to the vehicle 102. For example, if the vehicle condition controller 206 determines that an implement is attached to the vehicle 102, the display handler 204 displays a representation of the vehicle 102 and any attached implements. Likewise, if the vehicle condition controller 206 determines that no implements are attached to the vehicle 102, the display handler 204 displays a representation of the vehicle 102.

In the illustrated example of FIG. 2, the vehicle condition controller 206 determines whether the lateral error of the vehicle 102 is greater than (e.g., satisfies) a first lateral error threshold and/or a second lateral error threshold. The comparison between the lateral error and the first lateral error threshold allows the vehicle condition controller 206 to determine if the vehicle 102 is within no man's land. In response to the vehicle condition controller 206 determining that the lateral error of the vehicle 102 exceeds (e.g., satisfies) the first lateral error threshold, the display handler 204 does not render the acquisition path.

In the illustrated example of FIG. 2, the comparison between the lateral error and the second lateral error threshold allows the vehicle condition controller 206 to determine if the vehicle 102 has moved outside of the second lateral error threshold such that if the originally calculated acquisition path is followed, the vehicle 102 will no longer acquire the selected guidance path but instead will be offset from the selected guidance path. For example, the vehicle condition controller 206 compares the lateral error between the vehicle 102 and the acquisition path to the second lateral error threshold. In response to the vehicle condition controller 206 determining that the lateral error of the vehicle 102 exceeds (e.g., satisfies) the second lateral error threshold, the display handler 204 updates the rendering of the acquisition path based on an updated acquisition path calculated by the guidance controller 116.

In the illustrated example of FIG. 2, the vehicle condition controller 206 determines whether the heading error of the vehicle 102 is greater than (e.g., satisfies) a heading error threshold. The comparison between the heading error and the heading error threshold allows the vehicle condition controller 206 to determine if the vehicle 102 is in a position where a feasible acquisition path cannot be generated. In response to the vehicle condition controller 206 determining that the heading error of the vehicle 102 exceeds (e.g., satisfies) the heading error threshold, the display handler 204 does not render the acquisition path.

In the illustrated example of FIG. 2, the vehicle condition controller 206 determines whether the change in the speed of the vehicle 102 is greater than (e.g., satisfies) a speed change threshold. For example, the guidance controller 116 calculates acquisition paths based on the speed of the vehicle 102. Thus, if the speed change exceeds (e.g., satisfies) the speed change threshold the vehicle 102 may not acquire the selected guidance path if the originally calculated acquisition path is followed. In response to the vehicle condition controller 206 determining that the speed change of the vehicle 102 exceeds (e.g., satisfies) the speed change threshold, the display handler 204 updates the rendering of the acquisition path based on an updated acquisition path calculated by the guidance controller 116.

In the illustrated example of FIG. 2, the vehicle condition controller 206 determines whether the vehicle 102 has changed directions. For example, the guidance controller 116 calculates acquisition paths based on the direction of travel (e.g., forward, reverse, etc.) of the vehicle 102. Thus, if the direction of travel of the vehicle changes, the vehicle 102 may not acquire the selected guidance path if the originally calculated acquisition path is followed. In the example of FIG. 2, the vehicle condition controller 206 determines whether the vehicle 102 has changed directions based on a shift in the gears of the vehicle 102. For example, the vehicle 102 may shift from a forward gear to a reverse gear or vice versa. In response to the vehicle condition controller 206 determining that the vehicle 102 has changed directions, the display handler 204 updates the rendering of the acquisition path based on an updated acquisition path calculated by the guidance controller 116.

In the illustrated example of FIG. 2, in some examples, the vehicle condition controller 206 determines whether the vehicle 102 has changed directions by comparing the heading error of the vehicle 102 to a second heading error threshold. In response to the vehicle condition controller 206 determining that the heading error of the vehicle 102 exceeds (e.g., satisfies) the second heading error threshold, the display handler 204 updates the rendering of the acquisition path based on an updated acquisition path calculated by the guidance controller 116.

In some examples, the vehicle condition controller 206 implements example means for determining vehicle conditions. The vehicle condition determining means is implemented by executable instructions such as that implemented by at least blocks 1304, 1312, 1314, 1322, 1328, 1330, 1332, and 1336 of FIG. 13. The executable instructions of blocks 1304, 1312, 1314, 1322, 1328, 1330, 1332, and 1336 of FIG. 13 may be executed on at least one processor such as the example processor 1412 of FIG. 14. In other examples, the vehicle condition determining means is implemented by hardware logic, hardware implemented state machines, logic circuitry, and/or any other combination of hardware, software, and/or firmware.

While an example manner of implementing the display controller 118 of FIG. 1 is illustrated in FIG. 2, one or more of the elements, processes and/or devices illustrated in FIG. 2 may be combined, divided, re-arranged, omitted, eliminated and/or implemented in any other way. Further, the example communication processor 202, the example the display handler 204, the example vehicle condition controller 206 and/or, more generally, the example display controller 118 of FIGS. 1 and/or 2 may be implemented by hardware, software, firmware and/or any combination of hardware, software and/or firmware. Thus, for example, any of the example communication processor 202, the example the display handler 204, the example vehicle condition controller 206 and/or, more generally, the example display controller 118 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example communication processor 202, the example the display handler 204, the example vehicle condition controller 206 and/or, more generally, the example display controller 118 of FIGS. 1 and/or 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example display controller 118 of FIGS. 1 and/or 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 13:
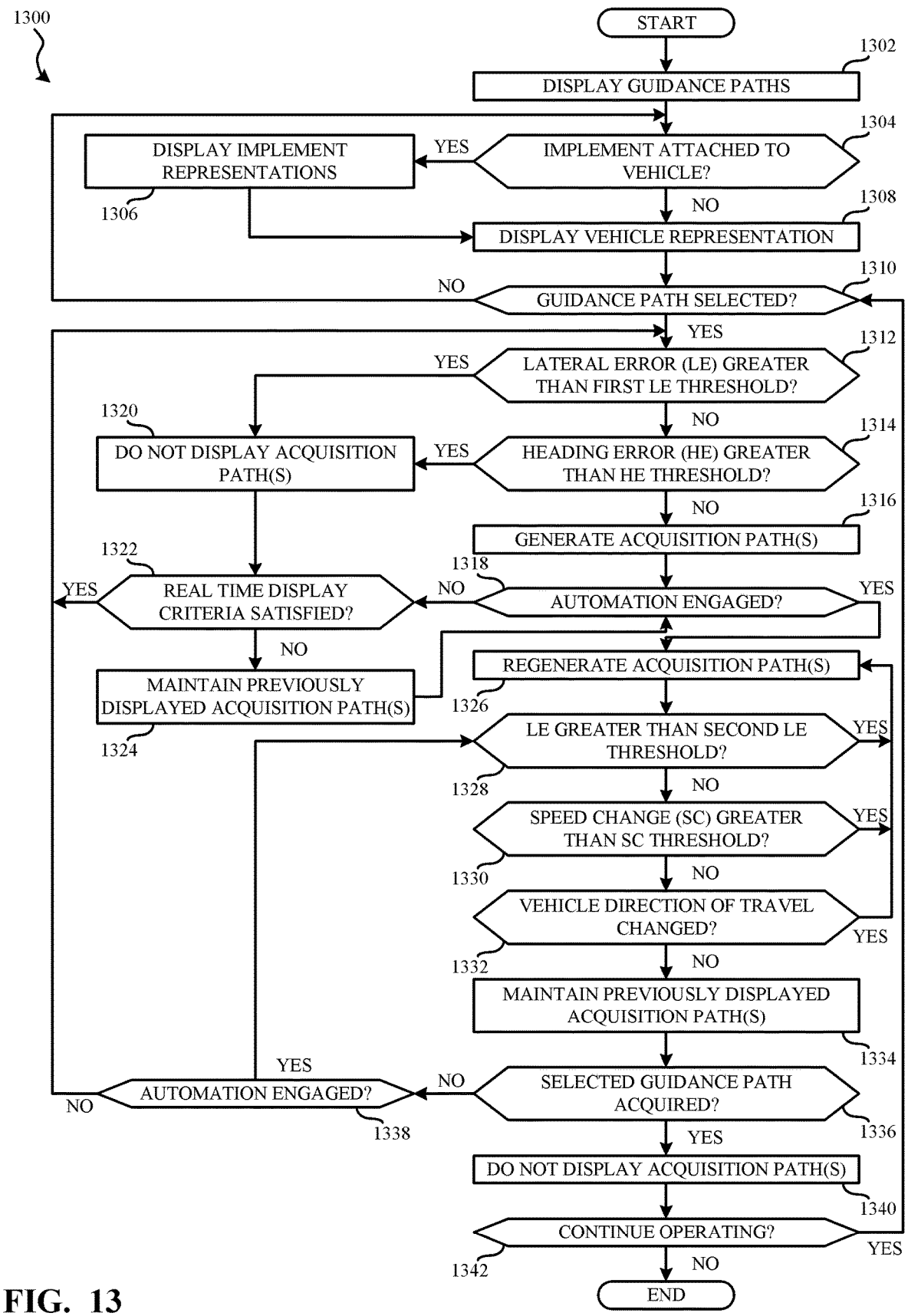
FIG. 13 is a flowchart representative of example machine readable instructions that may be executed to implement the display controller of FIG. 1 to display acquisition paths.

A flowchart representative of example hardware logic, machine readable instructions, hardware implemented state machines, and/or any combination thereof for implementing the display controller 118 of FIGS. 1 and/or 2 is shown in FIG. 13. The machine readable instructions may be one or more executable programs or portion(s) of an executable program for execution by a computer processor and/or processor circuitry, such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIG. 13, many other methods of implementing the example display controller 118 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 13 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 3:
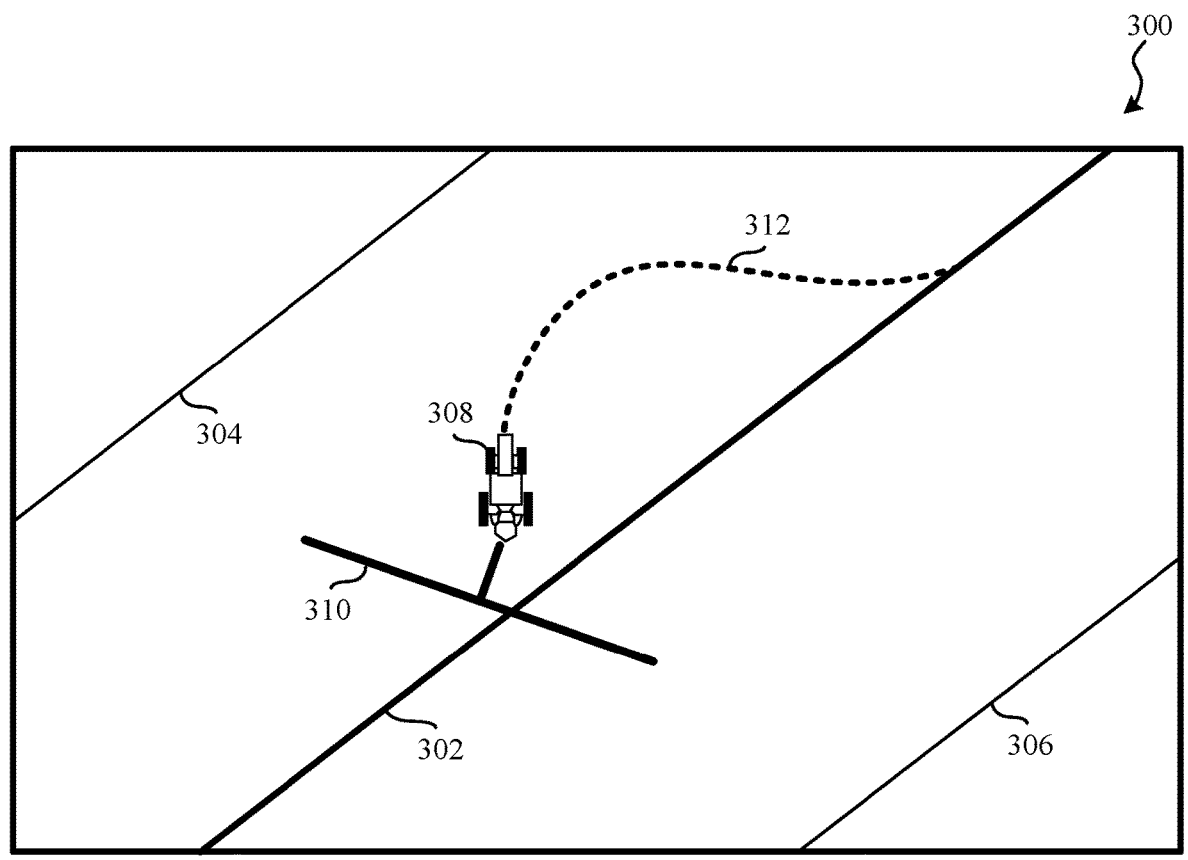
FIG. 3 is a schematic illustration of an example acquisition path displayed on an example user interface in accordance with the teachings of this disclosure.

FIG. 3 is a schematic illustration of an example acquisition path displayed on an example user interface 300 in accordance with the teachings of this disclosure. The user interface 300 includes an example first guidance path 302, an example second guidance path 304, an example third guidance path 306, an example vehicle representation 308, an example implement representation 310, and an example acquisition path 312. In the example of FIG. 3, the user interface 300 illustrates a scenario in which a user has selected the first guidance path 302 as a desired path for the vehicle 102 to acquire.

In the illustrated example of FIG. 3, the first, second, and third guidance paths 302, 304, and 306 represent paths along which the vehicle 102 may travel to tend to a field. In the example of FIG. 3, the vehicle representation 308 is rendered by the display handler 204 to represent the location of the vehicle 102 with respect to the first guidance path 302. The implement representation 310 is rendered by the display handler 204 to represent the location of an implement attached to the vehicle 102 with respect to the first guidance path 302.

In the illustrated example of FIG. 3, the acquisition path 312 represents a path along which the vehicle 102 is to travel to acquire the first guidance path 302 from the current location of the vehicle 102. The display handler 204 renders the acquisition path 312 as a dashed line in the same color as the first guidance path 302. As such, the display handler 204 indicates to the user that the acquisition path 312 is a temporary path by rendering the acquisition path 312 as a dashed line. Accordingly, the display handler 204 allows the user of the vehicle 102 to distinguish between the acquisition path 312 and the first guidance path 302.

Figure 4:
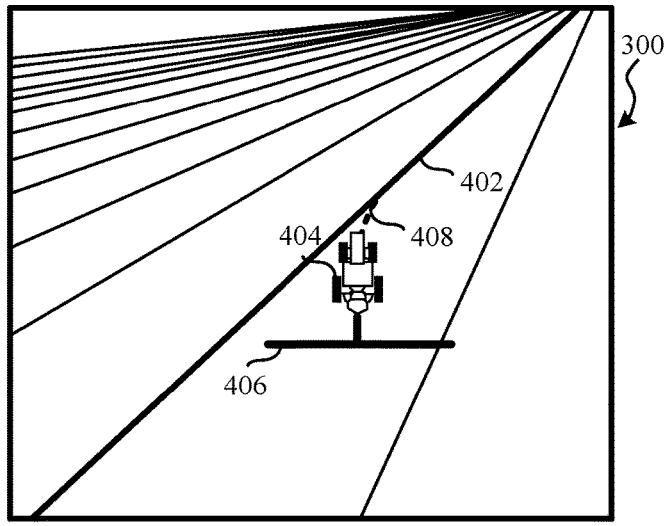
FIGS. 4, 5, and 6 are schematic illustrations of several instances of an example acquisition path displayed on the user interface of FIG. 3 when a vehicle including the display controller of FIG. 1 is in a standby autonomous mode of operation.
Figure 5:
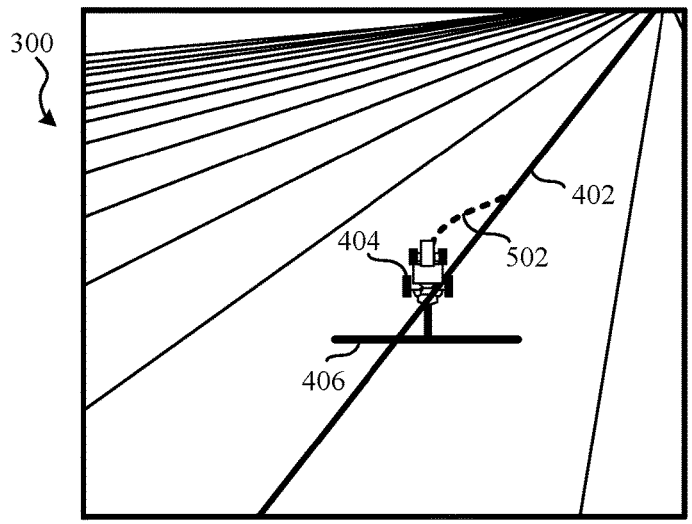
Figure 6:
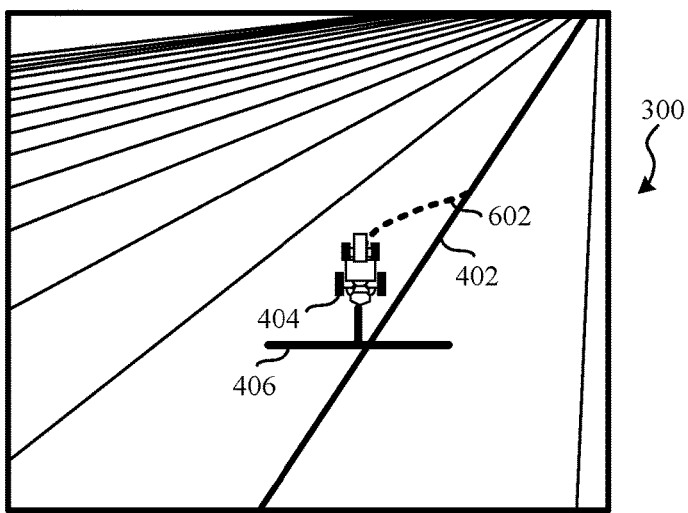

FIGS. 4, 5, and 6 are schematic illustrations of several instances of an example acquisition path displayed on the user interface 300 of FIG. 3 when a vehicle including the display controller 118 of FIG. 1 is in a standby autonomous mode of operation.

In the illustrated example of FIG. 4, the user interface 300 includes an example guidance path 402, an example vehicle representation 404, an example implement representation 406, and an example first instance 408 of an acquisition path. In the example of FIG. 4, the user interface 300 illustrates a scenario in which a user has selected the guidance path 402 as a desired path for the vehicle 102 to acquire and the vehicle 102 is in standby autonomous mode (e.g., the guidance system is not engaged).

In the illustrated example of FIG. 4, the guidance path 402 represents a path along which the vehicle 102 may travel to tend to a field. In the example of FIG. 4, the vehicle representation 404 is rendered by the display handler 204 to represent the location of the vehicle 102 with respect to the guidance path 402. The implement representation 406 is rendered by the display handler 204 to represent the location of an implement attached to the vehicle 102 with respect to the guidance path 402. In the illustrated example of FIG. 4, the first instance 408 of the acquisition path represents a path along which the vehicle 102 may travel to acquire the guidance path 402 from the current location of the vehicle 102 at a first time.

In the illustrated example of FIG. 5, the user interface 300 illustrates an example second instance 502 of the acquisition path as the user traverses the field with the vehicle 102. In the illustrated example of FIG. 5, the second instance 502 of the acquisition path represents a path along which the vehicle 102 may travel to acquire the guidance path 402 from the current location of the vehicle 102 at a second time. In the example of FIG. 5, the vehicle 102 has changed position as compared to the position of the vehicle 102 at the first time (e.g., illustrated in FIG. 4). In the example of FIG. 5, the display handler 204 has updated the user interface 300 to represent the updated position of the vehicle 102 and the attached implement as well as to communicate an updated acquisition path (e.g., the second instance 502) to the user.

In the illustrated example of FIG. 6 the user interface 300 illustrates an example third instance 602 of the acquisition path as the user traverses the field with the vehicle 102. In the illustrated example of FIG. 6, the third instance 602 of the acquisition path represents a path along which the vehicle 102 may travel to acquire the guidance path 402 from the current location of the vehicle 102 at a third time. In the example of FIG. 6, the vehicle 102 has changed position as compared to the position of the vehicle 102 at the second time (e.g., illustrated in FIG. 5). In the example of FIG. 6, the display handler 204 has updated the user interface 300 to represent the updated position of the vehicle 102 and the attached implement as well as to communicate an updated acquisition path (e.g., the third instance 602) to the user.

In the illustrated example of FIGS. 4, 5, and 6, the display handler 204 regenerates the acquisition path (e.g., the first, second, and third instances 408, 502, and 602) and updates the user interface 300. As such, the display handler 204 ensures that the current trajectory of the vehicle 102 is displayed to the user. In examples disclosed herein, when in the standby autonomous mode of operation, the display handler 204 regenerates the acquisition path and updates the user interface 300 based on a timer and/or the position of the vehicle 102. For example, the display handler 204 regenerates the acquisition path and updates the user interface 300 based on a periodic time constraint (e.g. every 200 ms). Additionally or alternatively, the display handler 204 regenerates the acquisition path and updates the user interface 300 based on a relative change in the position of the vehicle 102 (e.g., distance traveled, heading change, etc.)

Figure 7:
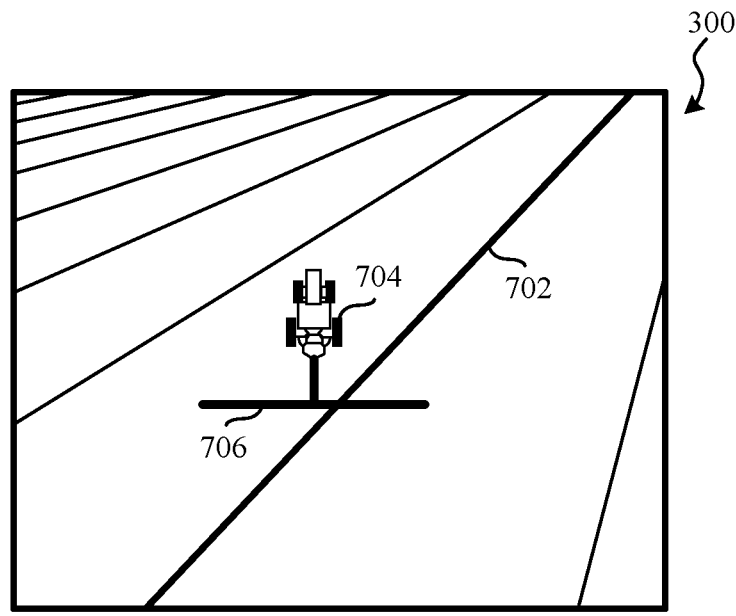
FIG. 7 is a schematic illustration of the user interface of FIG. 3 when an error condition is present.

FIG. 7 is a schematic illustration of the user interface 300 of FIG. 3 when an error condition is present. In the example of FIG. 7, the user interface 300 includes an example guidance path 702, an example vehicle representation 704, an example implement representation 706. In the example of FIG. 7, the user interface 300 illustrates a scenario in which a user has selected the guidance path 702 as a desired path for the vehicle 102 to acquire and the vehicle 102 is in standby autonomous mode (e.g., the guidance system is not engaged).

In the illustrated example of FIG. 7, the guidance path 702 represents a path along which the vehicle 102 may travel to tend to a field. In the example of FIG. 7, the vehicle representation 704 is rendered by the display handler 204 to represent the location of the vehicle 102 with respect to the guidance path 702. The implement representation 706 is rendered by the display handler 204 to represent the location of an implement attached to the vehicle 102 with respect to the guidance path 702.

In the illustrated example of FIG. 7, the error condition corresponds to the lateral error of the vehicle 102 exceeding the first lateral error threshold (e.g., the vehicle 102 is in no man's land). As such, the display handler 204 does not display an acquisition path on the user interface 300. The lack of an acquisition path indicates to the user that the guidance path cannot feasibly be acquired given the current location and/or heading of the vehicle 102.

Figure 8:
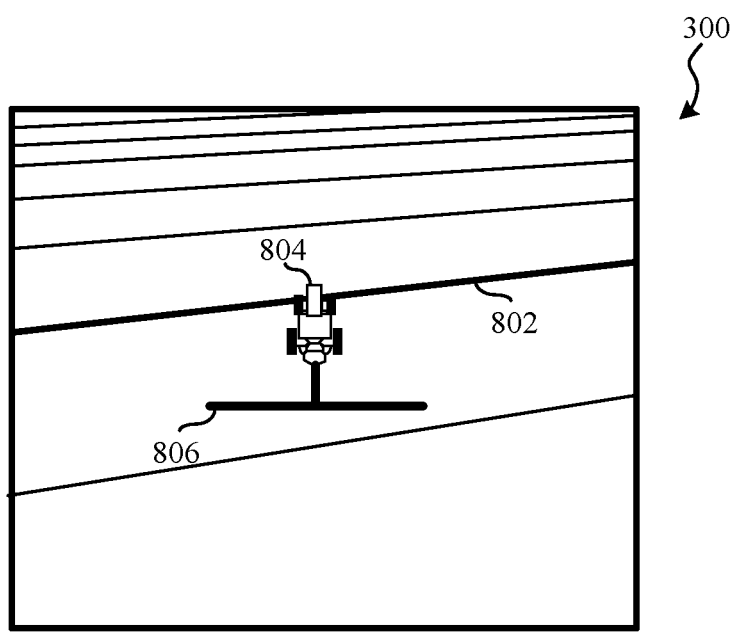
FIG. 8 is a schematic illustration of the user interface of FIG. 3 when an alternative error condition is present.

FIG. 8 is a schematic illustration of the user interface 300 of FIG. 3 when an alternative error condition is present. In the example of FIG. 8, the user interface 300 includes an example an example guidance path 802, an example vehicle representation 804, an example implement representation 806. In the example of FIG. 8, the user interface 300 illustrates a scenario in which a user has selected the guidance path 802 as a desired path for the vehicle 102 to acquire and the vehicle 102 is in standby autonomous mode (e.g., the guidance system is not engaged).

In the illustrated example of FIG. 8, the guidance path 802 represents a path along which the vehicle 102 may travel to tend to a field. In the example of FIG. 8, the vehicle representation 804 is rendered by the display handler 204 to represent the location of the vehicle 102 with respect to the guidance path 802. The implement representation 806 is rendered by the display handler 204 to represent the location of an implement attached to the vehicle 102 with respect to the guidance path 802.

In the illustrated example of FIG. 8, the error condition corresponds to the heading error of the vehicle 102 exceeding the first heading error threshold. As such, the display handler 204 does not display an acquisition path on the user interface 300. The lack of an acquisition path indicates to the user that the guidance path cannot feasibly be acquired given the current location and/or heading of the vehicle 102.

Figure 9:
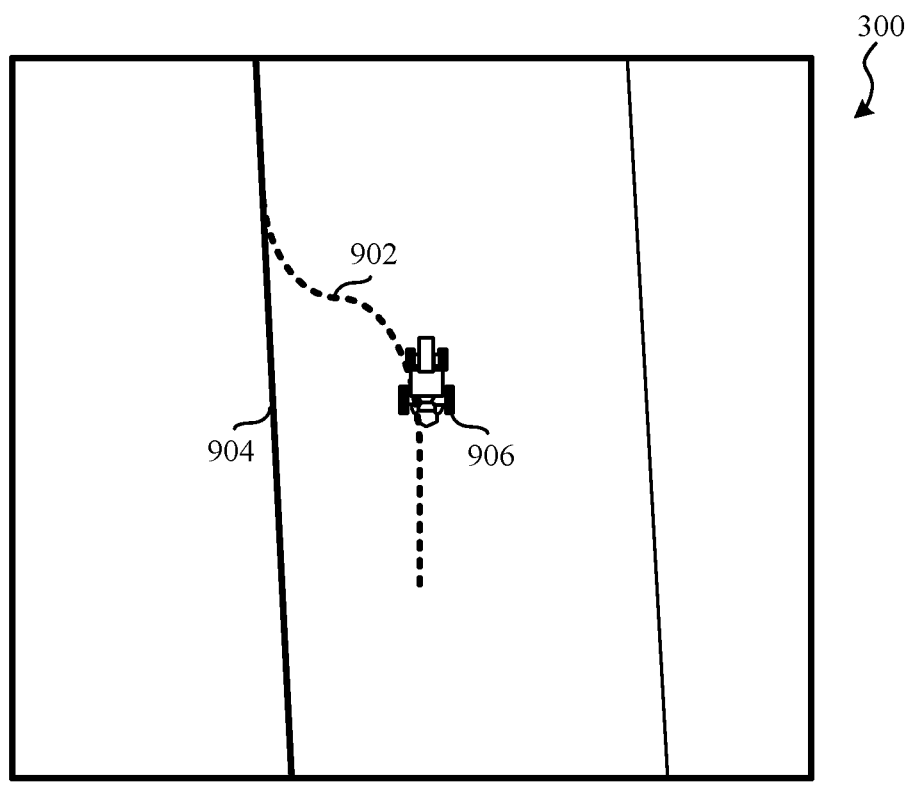
FIG. 9 is a schematic illustration of an example acquisition path displayed on the user interface of FIG. 3 during acquisition of an example guidance path when a vehicle including the display controller of FIG. 1 is in a fully autonomous mode of operation.

FIG. 9 is a schematic illustration of an example acquisition path 902 displayed on the user interface 300 of FIG. 3 during acquisition of an example guidance path 904 when a vehicle including the display controller 118 of FIG. 1 is in a fully autonomous mode of operation. In the example of FIG. 9, the user interface 300 illustrates a scenario in which a user has selected the guidance path 904 as a desired path for the vehicle 102 to acquire and the vehicle 102 is in fully autonomous mode (e.g., the guidance system is engaged).

In the illustrated example of FIG. 9, the acquisition path 902 represents a path along which the vehicle 102 is to travel to acquire the guidance path 904 from the current location of the vehicle 102. The guidance path 904 represents a path along which the vehicle 102 may travel to tend to a field. In the example of FIG. 9, the vehicle representation 906 is rendered by the display handler 204 to represent the location of the vehicle 102 with respect to the guidance path 904.

In the illustrated example of FIG. 9, the display handler 204 displays the acquisition path and maintains (e.g., persists, does not regenerate, etc.) the display of the acquisition path without updating the rendering of the acquisition path until the vehicle 102 converges on the guidance path 904. For example, the display handler 204 does not update the rendering of the acquisition path because the vehicle 102 is in the fully autonomous mode of operation.

Figure 10:
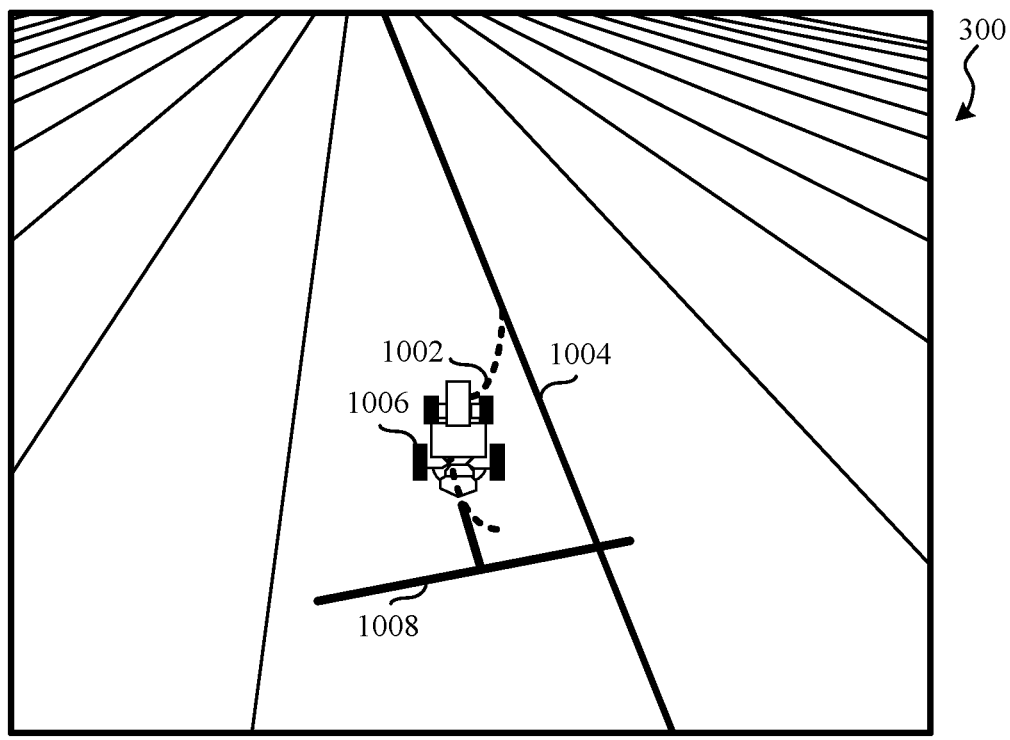
FIGS. 10 and 11 are a schematic illustration of a scenario in which an acquisition path displayed on the user interface of FIG. 3 when a vehicle including the display controller of FIG. 1 is in a fully autonomous mode of operation will be updated.
Figure 11:
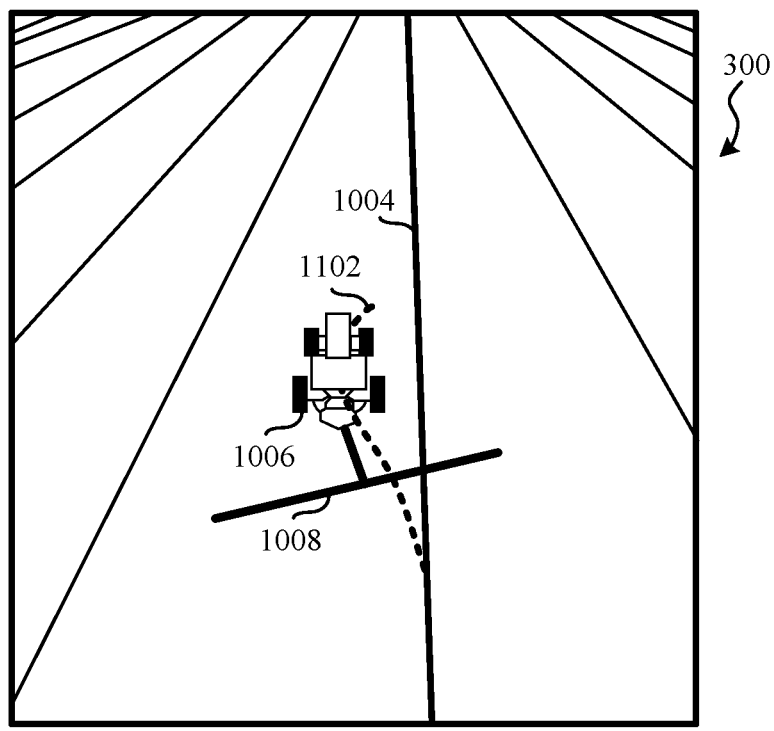

FIGS. 10 and 11 are schematic illustrations of a scenario in which an acquisition path displayed on the user interface 300 of FIG. 3 when a vehicle including the display controller 118 of FIG. 1 is in a fully autonomous mode of operation will be updated. In the example of FIG. 10, the user interface 300 includes an example first instance 1002 of the acquisition path, an example guidance path 1004, an example vehicle representation 1006, and an example implement representation 1008.

In the illustrated example of FIG. 10, the user interface 300 illustrates a scenario in which a user has selected the guidance path 1004 as a desired path for the vehicle 102 to acquire and the vehicle 102 is in fully autonomous mode (e.g., the guidance system is engaged). In the example of FIG. 10, the first instance 1002 of the acquisition path represents a path along which the vehicle 102 is to travel to acquire the guidance path 1004 from the current location of the vehicle 102. The guidance path 1004 represents a path along which the vehicle 102 may travel to tend to a field. In the example of FIG. 10, the vehicle representation 1006 is rendered by the display handler 204 to represent the location of the vehicle 102 with respect to the guidance path 1004. The implement representation 1008 is rendered by the display handler 204 to represent the location of an implement attached to the vehicle 102 with respect to the guidance path 1004. In the example of FIG. 10, the vehicle 102 is travelling forward.

In the illustrated example of FIG. 11, the user interface 300 illustrates an example second instance 1102 of the acquisition path as the vehicle 102 traverses the field. In the example of FIG. 11, the vehicle 102 has changed direction so that the vehicle 102 is now travelling in reverse. For example, the vehicle 102 has changed gears from forward to reverse. In response to the vehicle 102 changing gears from forward to reverse, the vehicle condition controller 206 determines that the vehicle 102 has changed directions. As such, the display handler 204 has updated the user interface 300 to represent the updated direction of the vehicle 102 and the attached implement as well as to communicate an updated acquisition path (e.g., the second instance 1102) to the user. In the example of FIG. 11, the display handler 204 updates the user interface 300 because the vehicle 102 has changed direction from forward to reverse.

In additional or alternative examples, when the vehicle 102 is in a fully autonomous mode of operation, the display handler 204 will update the user interface 300 to represent an updated acquisition path when the lateral error of the vehicle 102 with respect to the acquisition path exceeds (e.g., satisfies) a threshold (e.g., the second lateral error threshold). As such, when the guidance controller 116 corrects for poor acquisition performance (e.g., vehicle slip, etc.) by recomputing the optimal trajectory to the guidance path 1004, the display handler 204 can display a new instance of the acquisition path. In some examples, when the vehicle 102 is in a fully autonomous mode of operation, the display handler 204 will update the user interface 300 to represent an updated acquisition path when the speed change of the vehicle 102 exceeds (e.g., satisfies) a threshold. A such, when the guidance controller 116 accounts and adjusts for steering limitations based on the speed of the vehicle 102 by recomputing the optimal trajectory to the guidance path 1004, the display handler 204 can display a new instance of the acquisition path.

Figure 12:
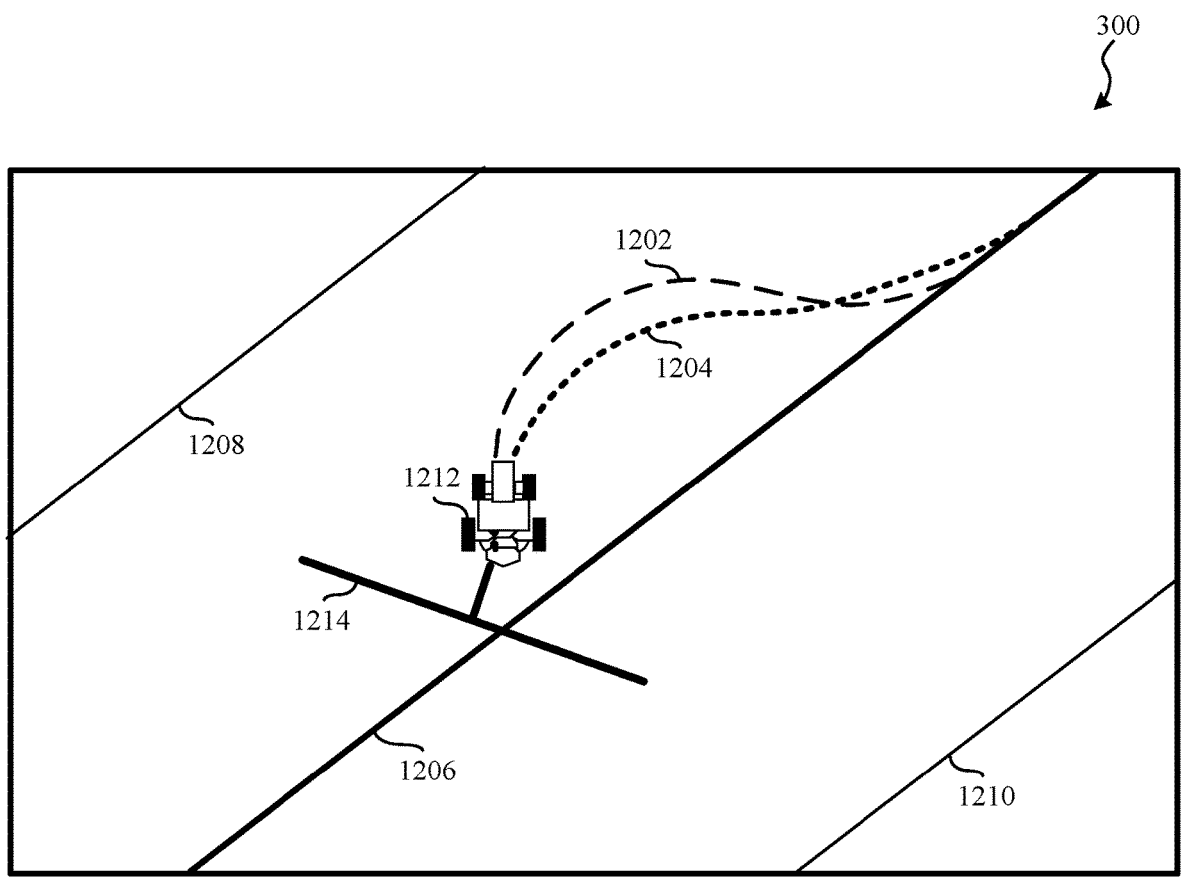
FIG. 12 is a schematic illustration of an example first acquisition path corresponding to a vehicle and an example second acquisition path corresponding to an implement displayed on the user interface of FIG. 3 during acquisition of an example first guidance path in accordance with the teachings of this disclosure.

FIG. 12 is a schematic illustration of an example first acquisition path 1202 corresponding to a vehicle and an example second acquisition path 1204 corresponding to an implement displayed on the user interface 300 of FIG. 3 during acquisition of an example first guidance path 1206 in accordance with the teachings of this disclosure. In the example of FIG. 12, the user interface 300 includes the example first acquisition path 1202, the example second acquisition path 1204, the example first guidance path 1206, an example second guidance path 1208, an example third guidance path 1210, an example vehicle representation 1212, and an example implement representation 1214. In the example of FIG. 12, the user interface 300 illustrates a scenario in which a user has selected the first guidance path 1206 as a desired path for the vehicle 102 to acquire and guidance information is available for the implement attached to the vehicle 102.

In the illustrated example of FIG. 12, the first, second, and third guidance paths 1206, 1208, and 1210 represent paths along which the vehicle 102 may travel to tend to a field. In the example of FIG. 12, the vehicle representation 1212 is rendered by the display handler 204 to represent the location of the vehicle 102 with respect to the first guidance path 1206. The implement representation 1214 is rendered by the display handler 204 to represent the location of an implement attached to the vehicle 102 with respect to the first guidance path 1206.

In the illustrated example of FIG. 12, the first acquisition path 1202 represents a path along which the vehicle 102 is to travel to acquire the first guidance path 1206 from the current location of the vehicle 102. The display handler 204 renders the first acquisition path 1202 as a dashed line in the same color as the first guidance path 1206. As such, the display handler 204 indicates to the user that the first acquisition path 1202 is a temporary path by rendering the first acquisition path 1202 as a dashed line. In the example of FIG. 12, the second acquisition path 1204 represents a path along which the implement attached to the vehicle 102 is to travel to acquire the first guidance path 1206 from the current location of the implement attached to the vehicle 102. The display handler 204 renders the second acquisition path 1204 as a dashed line in the same color as the implement representation 1214. In additional or alternative examples, the display handler 204 renders the second acquisition path 1204 as a dashed line in the same color as the guidance path of the implement. In some examples, the display handler 204 displays the second acquisition path 1204 as a different color than the first acquisition path 1202. As such, the display handler 204 indicates to the user that the second acquisition path 1204 is a temporary path by rendering the second acquisition path 1204 as a dashed line. Accordingly, the display handler 204 allows the user of the vehicle 102 to distinguish between the first acquisition path 1202, the second acquisition path 1204, and the first guidance path 1206.

FIG. 13 is a flowchart representative of example machine-readable instructions 1300 that may be executed to implement the display controller 118 of FIG. 1 to display acquisition paths. For example, the machine-readable instructions 1300, when executed, cause (e.g., the instructions cause) a processor to implement the display controller 118. The machine-readable instructions 1300 begin at block 1302 where the display handler 204 displays one or more guidance paths on the user display 106. At block 1304, the vehicle condition controller 206 determines whether an implement is attached to the vehicle 102.

In the illustrated example of FIG. 13, in response to the vehicle condition controller 206 determining that an implement is attached to the vehicle 102 (block 1304: YES), the machine-readable instructions 1300 proceed to block 1306. In response to the vehicle condition controller 206 determining that an implement is not attached to the vehicle 102 (block 1304: NO), the machine-readable instructions 1300 proceed to block 1308. At block 1306, the display handler 204 displays a representation of one or more implements attached to the vehicle 102 on the user display 106. At block 1308, the display handler 204 displays a representation of the vehicle 102 on the user display 106.

In the illustrated example of FIG. 13, at block 1310, the communication processor 202 determines whether a guidance path has been selected. In response to the communication processor 202 determining that a guidance path has been selected (block 1310: YES), the machine-readable instructions 1300 proceed to block 1312. In response to the communication processor 202 determining that a guidance path has not been selected (block 1310: NO), the machine-readable instructions 1300 returns to block 1304.

In the illustrated example of FIG. 13, at block 1312, the vehicle condition controller 206 determines whether the lateral error of the vehicle 102 is greater than (e.g., satisfies) the first lateral error threshold. In response to the vehicle condition controller 206 determining that the lateral error of the vehicle 102 satisfies the first lateral error threshold (block 1312: YES), the machine-readable instructions 1300 proceed to block 1320. In response to the vehicle condition controller 206 determining that the lateral error of the vehicle 102 does not satisfy the first lateral error threshold (block 1312: NO), the machine-readable instructions 1300 proceed to block 1314.

In the illustrated example of FIG. 13, at block 1314, the vehicle condition controller 206 determines whether the heading error of the vehicle 102 is greater than (e.g., satisfies) the heading error threshold. In response to the vehicle condition controller 206 determining that the heading error of the vehicle 102 satisfies the heading error threshold (block 1314: YES), the machine-readable instructions 1300 proceed to block 1320. In response to the vehicle condition controller 206 determining that the heading error of the vehicle 102 does not satisfy the heading error threshold (block 1314: NO), the machine-readable instructions 1300 proceed to block 1316.

In the illustrated example of FIG. 13, at block 1316, the display handler 204 generates (e.g., renders) an acquisition path for the vehicle 102 and, if guidance information for any implement attached the vehicle 102 is available, the display handler 204 generates (e.g., renders) an acquisition path for the implement. At block 1318, the communication processor 202 determines whether automation of the vehicle 102 is engaged (e.g., the vehicle 102 is in a fully autonomous mode of operation). For example, at block 1318, the communication processor 202 determines whether automation of the vehicle 102 is engaged based on the status of a switch and/or a button. In response to the communication processor 202 determining that automation is engaged (block 1318: YES), the machine-readable instructions 1300 proceed to block 1326. In response to the communication processor 202 determining that automation is not engaged (block 1318: NO), the machine-readable instructions 1300 proceed to block 1322.

In the illustrated example of FIG. 13, at block 1320, in response to the lateral error of the vehicle 102 exceeding the first lateral error threshold and/or the heading error of the vehicle 102 exceeding the first lateral error threshold, the display handler 204 does not display an acquisition path for the vehicle 102. At block 1322, the vehicle condition controller 206 determines whether real time display criteria are satisfied. For example, real time display criteria include whether a timer (e.g., 200 ms) has expired and/or whether there has been a relative change in the position of the vehicle (e.g., whether the vehicle 102 has travelled a distance as compared to a threshold, whether the heading of the vehicle 102 has changed as compared to a threshold, etc.).

In the illustrated example of FIG. 13, in response to the vehicle condition controller 206 determining that the real time display criteria are satisfied (block 1322: YES), the machine-readable instructions 1300 return to block 1312 where the vehicle condition controller 206 is to redetermine whether the lateral error of the vehicle 102 satisfies the first lateral error threshold to cause the acquisition path to be re-rendered and/or maintained. In response to the vehicle condition controller 206 determining that the real time display criteria are not satisfied (block 1322: NO), the machine-readable instructions 1300 proceed to block 1324. At block 1324, the display handler 204 maintains the previously displayed (e.g., previously rendered) acquisition path if displayed.

In the illustrated example of FIG. 13, at block 1326, the display handler 204 regenerates (e.g., re-renders) an acquisition path for the vehicle 102 and, if guidance information for any implement attached the vehicle 102 is available, the display handler 204 generates (e.g., renders) an acquisition path for the implement. At block 1328, the vehicle condition controller 206 determines whether the lateral error of the vehicle 102 is greater than (e.g., satisfies) the second lateral error threshold. In response to the vehicle condition controller 206 determining that the lateral error of the vehicle 102 satisfies the second lateral error threshold (block 1328: YES), the machine-readable instructions 1300 return to block 1326. In response to the vehicle condition controller 206 determining that the lateral error of the vehicle 102 does not satisfy the second lateral error threshold (block 1328: NO), the machine-readable instructions 1300 proceed to block 1330.

In the illustrated example of FIG. 13, at block 1330, the vehicle condition controller 206 determines whether the speed change of the vehicle 102 is greater than (e.g., satisfies) a speed change threshold. In response to the vehicle condition controller 206 determining that the speed change of the vehicle 102 satisfies the speed change threshold (block 1330: YES), the machine-readable instructions 1300 return to block 1326. In response to the vehicle condition controller 206 determining that the speed change of the vehicle 102 does not satisfy the speed change threshold (block 1330: NO), the machine-readable instructions 1300 proceed to block 1332.

In the illustrated example of FIG. 13, at block 1332, the vehicle condition controller 206 determines whether the direction of travel of the vehicle 102 has changed. For example, at block 1332, the vehicle condition controller 206 determines whether the direction of travel of the vehicle 102 has changed based on whether the gears of the vehicle 102 have shifted from forward to reverse. In some examples, the vehicle condition controller 206 determines whether the direction of travel of the vehicle 102 has changed based on whether the heading error satisfies a second heading error threshold. In response to the vehicle condition controller 206 determining that the direction of travel of the vehicle 102 has changed (block 1332: YES), the machine-readable instructions 1300 return to block 1326. In response to the vehicle condition controller 206 determining that the direction of travel of the vehicle 102 has not changed (block 1332: NO), the machine-readable instructions 1300 proceed to block 1334.

In the illustrated example of FIG. 13, at block 1334, the display handler 204 maintains the previously displayed (e.g., previously rendered) acquisition path. At block 1336, the vehicle condition controller 206 determines whether the vehicle 102 has acquired the selected guidance path. In response to the vehicle condition controller 206 determining that the vehicle 102 has acquired the selected guidance path (block 1336: YES), the machine-readable instructions 1300 proceed to block 1340. In response to the vehicle condition controller 206 determining that the vehicle 102 has not acquired the selected guidance path (block 1336: NO), the machine-readable instructions 1300 proceed to block 1338.

In the illustrated example of FIG. 13, at block 1338, the communication processor 202 determines whether automation of the vehicle 102 is engaged (e.g., the vehicle 102 is in a fully autonomous mode of operation). In response to the communication processor 202 determining that automation is engaged (block 1338: YES), the machine-readable instructions 1300 return to block 1328. In response to the communication processor 202 determining that automation is not engaged (block 1338: NO), the machine-readable instructions 1300 return to block 1312.

In the illustrated example of FIG. 13, at block 1340, in response to the vehicle 102 acquiring the selected guidance path, the display handler 204 does not display an acquisition path for the vehicle 102. At block 1342, the communication processor 202 determines whether to continue operating. In response to the communication processor 202 determining to continue operating (block 1342: YES), the machine-readable instructions 1300 return to block 1310. In responses to the communication processor 202 determining not to continue operating (block 1342: NO), the machine-readable instructions 1300 terminate. For example, a condition that can cause the communication processor 202 to determine not to continue operating includes disablement of automation and/or shutdown of the vehicle 102, among others.

Figure 14:
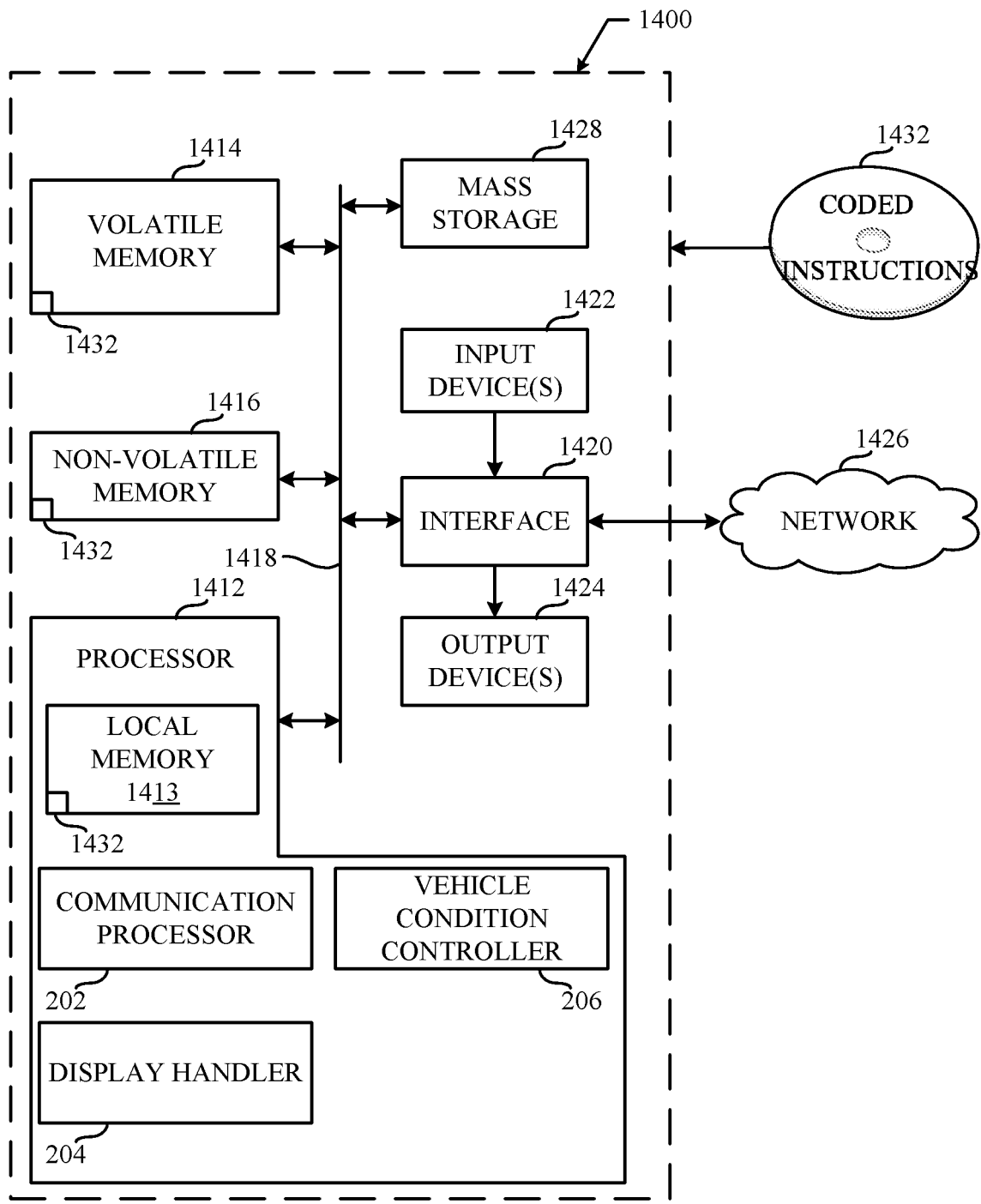
FIG. 14 is a block diagram of an example processing platform structured to execute the instructions of FIG. 13 to implement the display controller of FIGS. 1 and/or 2.

FIG. 14 is a block diagram of an example processor platform 1400 structured to execute the machine-readable instructions 1300 of FIG. 13 to implement the display controller 118 of FIGS. 1 and/or 2. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor 1412 may be a semiconductor based (e.g., silicon based) device. In this example, the processor 1412 implements the example communication processor 202, the example the display handler 204, and/or the example vehicle condition controller 206.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random-Access Memory (SDRAM), Dynamic Random-Access Memory (DRAM), RAMBUS® Dynamic Random-Access Memory (RDRAM®) and/or any other type of random-access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIG. 14 include the machine-readable instructions 1300 of FIG. 13 and may be stored in the mass storage device 1428, in the volatile memory 1414, in the non-volatile memory 1416, and/or on a removable non-transitory computer readable storage medium such as a CD or DVD.

Figure 15:
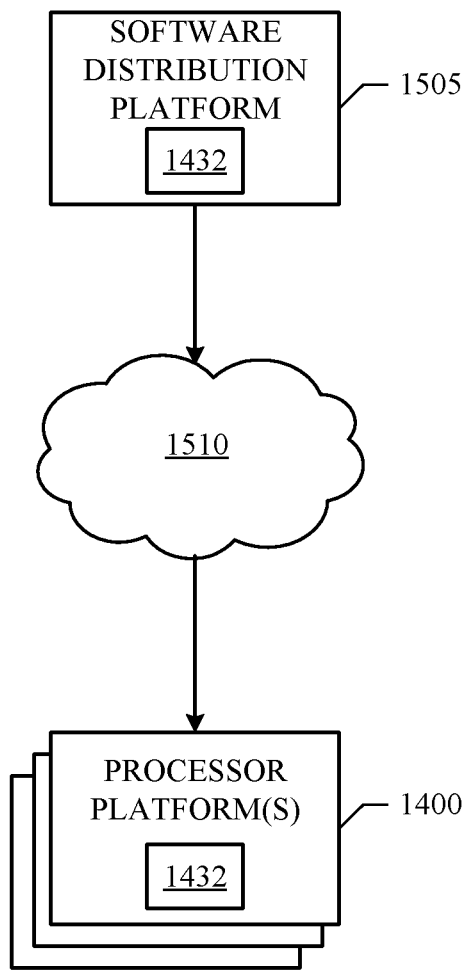
FIG. 15 is a block diagram of an example software distribution platform to distribute software (e.g., software corresponding to the example computer readable instructions of FIG. 13) to client devices such as those owned and/or operated by consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1505 to distribute software such as the example computer readable instructions 1432 of FIG. 14 to devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1432 of FIG. 14. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the computer readable instructions 1432, which may correspond to the example computer readable instructions 1300 of FIG. 13, as described above. The one or more servers of the example software distribution platform 1505 are in communication with a network 1510, which may correspond to any one or more of the Internet and/or any of the example networks described above. In some examples, the one or more servers are responsive to requests to transmit the software to a device owned and/or operated by a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1432 from the software distribution platform 1505 to a device. For example, the software, which may correspond to the example computer readable instructions 1432 of FIG. 14, may be downloaded to the example processor platform 1400, which is to execute the computer readable instructions 1432 to implement the display controller 118. In some example, one or more servers of the software distribution platform 1505 periodically offer, transmit, and/or force updates to the software (e.g., the example computer readable instructions 1432 of FIG. 14) to ensure improvements, patches, updates, etc. are distributed and applied to the software at the end user devices.

From the foregoing, it will be appreciated that example methods, apparatus and articles of manufacture have been disclosed that display acquisition paths. The disclosed methods, apparatus, and articles of manufacture advantageously display acquisition paths from any location of a vehicle to a selected guidance path. As such, examples disclosed herein, improve user experience when operating a vehicle (e.g., a farming vehicle, an agriculture vehicle, etc.). For example, examples disclosed herein prevent unexpected movement of vehicles operating in fully autonomous modes of operation.

The disclosed methods, apparatus and articles of manufacture improve the efficiency of using a computing device by reducing the computing resource consumption of the computing device while maintaining the benefits of displaying acquisition paths to a user. For example, the methods, apparatus, and articles of manufacture disclosed herein do not regenerate and/or otherwise re-render acquisition paths for a vehicle when conditions of the vehicle satisfy at least one threshold described above. By not needlessly regenerating and/or otherwise re-rendering acquisition paths, examples disclosed herein reduce (e.g., prevent) computing resource consumption. Additionally, in some examples, the methods, apparatus, and articles of manufacture disclosed herein do not generate and/or otherwise render acquisition paths. For example, if the vehicle is in a position from which a selected guidance path cannot be feasibly acquired, examples disclosed herein do not generate and/or otherwise render an acquisition path. As such, examples disclosed herein reduce (e.g., prevent) computing resource consumption. The disclosed methods, apparatus and articles of manufacture are accordingly directed to one or more improvement(s) in the functioning of a computer.

Example methods, apparatus, systems, and articles of manufacture to display acquisition paths are disclosed herein. Further examples and combinations thereof include the following:

Example 1 includes an apparatus comprising a display handler to, in response to a directional condition of an autonomous vehicle satisfying a threshold, render an acquisition path for the autonomous vehicle, the acquisition path specifying a route along which the autonomous vehicle is to travel to acquire a guidance path, and a vehicle condition controller to, in response to determining that a real time display criterion is satisfied, redetermine whether the directional condition of the autonomous vehicle satisfies the threshold to cause the display handler to re-render the acquisition path.

Example 2 includes the apparatus of example 1, wherein the directional condition includes at least one of lateral error of the autonomous vehicle or heading error of the autonomous vehicle.

Example 3 includes the apparatus of example 1, further including a communication processor to determine whether the autonomous vehicle is in a standby autonomous mode of operation based on a status of at least one of a switch or a button.

Example 4 includes the apparatus of example 1, wherein the guidance path is displayed in a color and the display handler is to render the acquisition path as a dashed line in the color.

Example 5 includes the apparatus of example 1, wherein the acquisition path is a first acquisition path, the directional condition is a first directional condition, and the display handler is to, when guidance information specifying a second directional condition of an implement attached to the autonomous vehicle is available, render a second acquisition path for the implement.

Example 6 includes the apparatus of example 1, wherein the display handler is to, in response to the real time display criterion not being satisfied, maintain the rendering of the acquisition path.

Example 7 includes the apparatus of example 1, wherein the threshold is a first threshold and the real time display criterion includes at least one of whether a timer has expired, whether the autonomous vehicle has travelled a distance as compared to a second threshold, or whether a heading of the autonomous vehicle has changed as compared to a third threshold.

Example 8 includes a non-transitory computer readable medium comprising instructions that, when executed, cause one or more processors to at least in response to a directional condition of an autonomous vehicle satisfying a threshold, render an acquisition path for the autonomous vehicle, the acquisition path specifying a route along which the autonomous vehicle is to travel to acquire a guidance path, and in response to determining that a real time display criterion is satisfied, redetermine whether the directional condition of the autonomous vehicle satisfies the threshold to cause the acquisition path to be re-rendered.

Example 9 includes the computer readable medium of example 8, wherein the directional condition includes at least one of lateral error of the autonomous vehicle or heading error of the autonomous vehicle.

Example 10 includes the computer readable medium of example 8, wherein the instructions cause the one or more processors to determine whether the autonomous vehicle is in a standby autonomous mode of operation based on a status of at least one of a switch or a button.

Example 11 includes the computer readable medium of example 8, wherein the guidance path is displayed in a color and the instructions cause the one or more processors to render the acquisition path as a dashed line in the color.

Example 12 includes the computer readable medium of example 8, wherein the acquisition path is a first acquisition path, the directional condition is a first directional condition, and the instructions cause the one or more processors to, when guidance information specifying a second directional condition of an implement attached to the autonomous vehicle is available, render a second acquisition path for the implement.

Example 13 includes the computer readable medium of example 8, wherein the instructions cause the one or more processors to, in response to the real time display criterion not being satisfied, maintain the rendering of the acquisition path.

Example 14 includes the computer readable medium of example 8, wherein the threshold is a first threshold and the real time display criterion includes at least one of whether a timer has expired, whether the autonomous vehicle has travelled a distance as compared to a second threshold, or whether a heading of the autonomous vehicle has changed as compared to a third threshold.

Example 15 includes a method comprising in response to a directional condition of an autonomous vehicle satisfying a threshold, rendering an acquisition path for the autonomous vehicle, the acquisition path specifying a route along which the autonomous vehicle is to travel to acquire a guidance path, and in response to determining that a real time display criterion is satisfied, redetermining whether the directional condition of the autonomous vehicle satisfies the threshold to cause the acquisition path to be re-rendered.

Example 16 includes the method of example 15, wherein the directional condition includes at least one of lateral error of the autonomous vehicle or heading error of the autonomous vehicle.

Example 17 includes the method of example 15, further including determining whether the autonomous vehicle is in a standby autonomous mode of operation based on a status of at least one of a switch or a button.

Example 18 includes the method of example 15, wherein the guidance path is displayed in a color and the method further includes rendering the acquisition path as a dashed line in the color.

Example 19 includes the method of example 15, wherein the acquisition path is a first acquisition path, the directional condition is a first directional condition, and the method further includes, when guidance information specifying a second directional condition of an implement attached to the autonomous vehicle is available, rendering a second acquisition path for the implement.

Example 20 includes the method of example 15, further including, in response to the real time display criterion not being satisfied, maintaining the rendering of the acquisition path.

Example 21 includes the method of example 15, wherein the threshold is a first threshold and the real time display criterion includes at least one of whether a timer has expired, whether the autonomous vehicle has travelled a distance as compared to a second threshold, or whether a heading of the autonomous vehicle has changed as compared to a third threshold.

Example 22 includes an apparatus comprising a vehicle condition controller to determine whether a directional condition of an autonomous vehicle satisfies a threshold, and a display handler to render an acquisition path for the autonomous vehicle, the acquisition path specifying a route along which the autonomous vehicle is to travel to acquire a guidance path, and in response to the directional condition of the autonomous vehicle satisfying the threshold, update the rendering of the acquisition path.

Example 23 includes the apparatus of example 22, wherein the directional condition includes at least one of lateral error of the autonomous vehicle, heading error of the autonomous vehicle, speed change of the autonomous vehicle, or a change in direction of travel of the autonomous vehicle.

Example 24 includes the apparatus of example 22, further including a communication processor to determine whether the autonomous vehicle is in a fully autonomous mode of operation based on a status of at least one of a switch or a button.

Example 25 includes the apparatus of example 22, wherein the guidance path is displayed in a color and the display handler is to render the acquisition path as a dashed line in the color.

Example 26 includes the apparatus of example 22, wherein the acquisition path is a first acquisition path, the directional condition is a first condition, and the display handler is to, when guidance information specifying a second condition of an implement attached to the autonomous vehicle is available, render a second acquisition path for the implement.

Example 27 includes the apparatus of example 22, wherein the display handler is to, in response to the autonomous vehicle acquiring the guidance path, no longer display the acquisition path.

Example 28 includes the apparatus of example 22, wherein the display handler is to, in response to the directional condition of the autonomous vehicle not satisfying the threshold, maintain the rendering of the acquisition path.

Example 29 includes a non-transitory computer readable medium comprising instructions that, when executed, cause one or more processors to at least determine whether a directional condition of an autonomous vehicle satisfies a threshold, render an acquisition path for the autonomous vehicle, the acquisition path specifying a route along which the autonomous vehicle is to travel to acquire a guidance path, and in response to the directional condition of the autonomous vehicle satisfying the threshold, update the rendering of the acquisition path.

Example 30 includes the computer readable medium of example 29, wherein the directional condition includes at least one of lateral error of the autonomous vehicle, heading error of the autonomous vehicle, speed change of the autonomous vehicle, or a change in direction of travel of the autonomous vehicle.

Example 31 includes the computer readable medium of example 29, wherein the instructions cause the one or more processors to determine whether the autonomous vehicle is in a fully autonomous mode of operation based on a status of at least one of a switch or a button.

Example 32 includes the computer readable medium of example 29, wherein the guidance path is displayed in a color and the instructions cause the one or more processors to render the acquisition path as a dashed line in the color.

Example 33 includes the computer readable medium of example 29, wherein the acquisition path is a first acquisition path, the directional condition is a first condition, and the instructions cause the one or more processors to, when guidance information specifying a second condition of an implement attached to the autonomous vehicle is available, render a second acquisition path for the implement.

Example 34 includes the computer readable medium of example 29, wherein the instructions cause the one or more processors to, in response to the autonomous vehicle acquiring the guidance path, no longer display the acquisition path.

Example 35 includes the computer readable medium of example 29, wherein the instructions cause the one or more processors to, in response to the directional condition of the autonomous vehicle not satisfying the threshold, maintain the rendering of the acquisition path.

Example 36 includes a method comprising determining whether a directional condition of an autonomous vehicle satisfies a threshold, rendering an acquisition path for the autonomous vehicle, the acquisition path specifying a route along which the autonomous vehicle is to travel to acquire a guidance path, and in response to the directional condition of the autonomous vehicle satisfying the threshold, updating the rendering of the acquisition path.

Example 37 includes the method of example 36, wherein the directional condition includes at least one of lateral error of the autonomous vehicle, heading error of the autonomous vehicle, speed change of the autonomous vehicle, or a change in direction of travel of the autonomous vehicle.

Example 38 includes the method of example 36, further including determining whether the autonomous vehicle is in a fully autonomous mode of operation based on a status of at least one of a switch or a button.

Example 39 includes the method of example 36, wherein the guidance path is displayed in a color and the method further includes rendering the acquisition path as a dashed line in the color.

Example 40 includes the method of example 36, wherein the acquisition path is a first acquisition path, the directional condition is a first condition, and the method further includes, when guidance information specifying a second condition of an implement attached to the autonomous vehicle is available, rendering a second acquisition path for the implement.

Example 41 includes the method of example 36, further including, in response to the autonomous vehicle acquiring the guidance path, no longer displaying the acquisition path.

Example 42 includes the method of example 36, further including, in response to the directional condition of the autonomous vehicle not satisfying the threshold, maintaining the rendering of the acquisition path.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   interface circuitry;
   machine-readable instructions; and
   at least one processor circuit to be programmed by the machine-readable instructions to:
   access, based on determining that a real time display criterion is satisfied, a current position of an autonomous vehicle and a current position of an implement attached to the autonomous vehicle, the current position of the autonomous vehicle and the current position of the implement determined by a location sensor of the autonomous vehicle;
   access, based on determining that the real time display criterion is satisfied, a guidance path for the autonomous vehicle, the guidance path based on navigation path data for the autonomous vehicle and the implement;
   compute a directional condition of the autonomous vehicle based on the current position of the autonomous vehicle in relation to the guidance path;
   determine whether the directional condition satisfies a threshold associated with feasibility of acquiring the guidance path from the current position;
   cause a display of the autonomous vehicle to render a first acquisition path for the autonomous vehicle, the first acquisition path specifying a route along which the autonomous vehicle is to travel to acquire the guidance path;
   cause the display to render a second acquisition path for the implement, the second acquisition path specifying a route along which the implement is to travel to acquire the guidance path; and
   in response to a determination that a speed change threshold is satisfied, cause the display to render a third acquisition path for the autonomous vehicle and a fourth acquisition path for the implement.

2. The apparatus of claim 1, wherein the directional condition includes at least one of lateral error of the autonomous vehicle or heading error of the autonomous vehicle.

3. The apparatus of claim 1, wherein one or more of the at least one processor circuit is to determine whether an autonomous mode of operation is engaged for the autonomous vehicle based on a status of at least one of a switch or a button.

4. The apparatus of claim 1, wherein one or more of the at least one processor circuit is to:
cause the display to render the guidance path in a color; and
cause the display to render the first acquisition path and the second acquisition path as dashed lines in the color.

5. The apparatus of claim 1, wherein one or more of the at least one processor circuit is to, based on the real time display criterion not being satisfied, maintain a previously displayed rendering of the first acquisition path and the second acquisition path.

6. The apparatus of claim 1, wherein the threshold associated with feasibility is a first threshold, and the real time display criterion includes at least one of whether a timer has expired, whether the autonomous vehicle has travelled a distance as compared to a second threshold, or whether a heading of the autonomous vehicle has changed as compared to a third threshold.

7. The apparatus of claim 1, wherein one or more of the at least one processor circuit is to cause a steering system of the autonomous vehicle to steer the autonomous vehicle along a previously displayed rendering of the first acquisition path based on a command transmitted to the steering system.

8. The apparatus of claim 1, wherein in response to a determination that the directional condition satisfies the threshold, cause the display to no longer render the first acquisition path and the second acquisition path.

9. The apparatus of claim 1, wherein the display is to render a representation of the implement, wherein the representation includes a location of the implement relative to the guidance path.

10. At least one non-transitory computer readable medium comprising instructions to cause at least one processor circuit to at least:
access, based on determining that a real time display criterion is satisfied, a current position of an autonomous vehicle and a current position of an implement attached to the autonomous vehicle, the current position of the autonomous vehicle and the current position of the implement determined by a location sensor of the autonomous vehicle;
access, based on determining that the real time display criterion is satisfied, a guidance path for the autonomous vehicle based on navigation path data for the autonomous vehicle and the implement;
compute a directional condition of the autonomous vehicle based on the current position of the autonomous vehicle in relation to the guidance path;
determine whether the directional condition satisfies a threshold associated with feasibility of acquiring the guidance path from the current position;
cause a display of the autonomous vehicle to render a first acquisition path for the autonomous vehicle, the first acquisition path specifying a route along which the autonomous vehicle is to travel to acquire the guidance path;
cause the display of the autonomous vehicle to render a second acquisition path for the implement, the second acquisition path specifying a route along which the implement is to travel to acquire the guidance path; and
in response to a determination that a speed change threshold is satisfied, cause the display to render a third acquisition path for the autonomous vehicle and a fourth acquisition path for the implement.

11. The at least one non-transitory computer readable medium of claim 10, wherein the directional condition includes at least one of lateral error of the autonomous vehicle or heading error of the autonomous vehicle.

12. The at least one non-transitory computer readable medium of claim 10, wherein the instructions are to cause one or more of the at least one processor circuit to determine whether an autonomous mode of operation is engaged for the autonomous vehicle based on a status of at least one of a switch or a button.

13. The at least one non-transitory computer readable medium of claim 10, wherein the instructions are to cause one or more of the at least one processor circuit to:
cause the display to render the guidance path in a color; and
cause the display to render the first acquisition path and the second acquisition path as dashed lines in the color.

14. The at least one non-transitory computer readable medium of claim 10, wherein the instructions are to cause one or more of the at least one processor circuit to, based on the real time display criterion not being satisfied, maintain a previously displayed rendering of the first acquisition path and the second acquisition path.

15. The at least one non-transitory computer readable medium of claim 10, wherein the threshold is a first threshold and the real time display criterion includes at least one of whether a timer has expired, whether the autonomous vehicle has travelled a distance as compared to a second threshold, or whether a heading of the autonomous vehicle has changed as compared to a third threshold.

16. The at least one non-transitory computer readable medium of claim 10, wherein the instructions are to cause one or more of the at least one processor circuit to cause a steering system of the autonomous vehicle to steer the autonomous vehicle along a previously displayed rendering of the first acquisition path based on a command transmitted to the steering system.

17. A method comprising:
based on determining that a real time display criterion is satisfied, accessing, by executing an instruction with one or more processors, a current position of an autonomous vehicle and a current position of an implement attached to the autonomous vehicle, the current position of the autonomous vehicle and the current position of the implement determined by a location sensor of the autonomous vehicle;
based on determining that the real time display criterion is satisfied, accessing, by executing an instruction with the one or more processors, a guidance path for the autonomous vehicle based on navigation path data for the autonomous vehicle and the implement;
computing, by executing an instruction with one or more processors, a directional condition of the autonomous vehicle based on the current position of the autonomous vehicle in relation to the guidance path;
determining, by executing an instruction with the one or more processors, whether the directional condition satisfies a threshold associated with feasibility of acquiring the guidance path from the current position;
causing a display of the autonomous vehicle to render a first acquisition path for the autonomous vehicle, the first acquisition path specifying a route along which the autonomous vehicle is to travel to acquire the guidance path;

causing the display of the autonomous vehicle to render a second acquisition path for the implement, the second acquisition path specifying a route along which the implement is to travel to acquire the guidance path; and in response to a determination that a speed change threshold is satisfied, causing the display to render a third acquisition path for the autonomous vehicle and a fourth acquisition path for the implement.

18. The method of claim 17, wherein the directional condition includes at least one of lateral error of the autonomous vehicle or heading error of the autonomous vehicle.

19. The method of claim 17, further including determining whether an autonomous mode of operation is engaged for the autonomous vehicle based on a status of at least one of a switch or a button.

20. The method of claim 17, further including:
displaying the guidance path in a color; and
rendering the first acquisition path and the second acquisition path as dashed lines in the color.

21. The method of claim 17, further including, based on the real time display criterion not being satisfied, maintaining a previously displayed rendering of the first acquisition path and the second acquisition path.

22. The method of claim 17, further including causing a steering system of the autonomous vehicle to steer the autonomous vehicle along a previously displayed rendering of the first acquisition path based on a command transmitted to the steering system.

* * * * *